US012354132B2

(12) United States Patent
Lo et al.

(10) Patent No.: US 12,354,132 B2
(45) Date of Patent: Jul. 8, 2025

(54) TERMINAL, METHOD, AND SERVER

(71) Applicant: 17LIVE Japan Inc., Tokyo (JP)

(72) Inventors: Hao-Jung Lo, Taipei (TW); Chia-Yi Yang, Taipei (TW); Yu-Hsin Chiang, Taipei (TW); Cheng-Chieh Chang, Taipei (TW); Sheng-Yen Wang, Taipei (TW); Liang-Fang Tsai, Taipei (TW)

(73) Assignee: 17LIVE Japan Inc., Tokyo (JP)

( * ) Notice: Subject to any disclaimer, the term of this patent is extended or adjusted under 35 U.S.C. 154(b) by 0 days.

(21) Appl. No.: 18/487,417

(22) Filed: Oct. 16, 2023

(65) Prior Publication Data
US 2024/0320706 A1 Sep. 26, 2024

(30) Foreign Application Priority Data
Mar. 20, 2023 (JP) ................................ 2023-044645

(51) Int. Cl.
*G06Q 30/02* (2023.01)
*G06Q 30/0242* (2023.01)
*H04H 60/33* (2008.01)

(52) U.S. Cl.
CPC ......... *G06Q 30/0244* (2013.01); *H04H 60/33* (2013.01)

(58) Field of Classification Search
CPC ........................... G06Q 30/0244; H04H 60/33
See application file for complete search history.

(56) References Cited

U.S. PATENT DOCUMENTS

| 10,021,458 | B1 * | 7/2018 | Taylor | H04N 21/2187 |
| 10,575,045 | B1 * | 2/2020 | Kruse | G06Q 30/0631 |
| 2010/0235764 | A1 * | 9/2010 | Yamazoe | G06Q 10/10 715/756 |
| 2014/0173660 | A1 * | 6/2014 | Correa | H04N 21/8173 725/42 |
| 2022/0284495 | A1 * | 9/2022 | Knezi | H04N 21/47815 |
| 2022/0343952 | A1 * | 10/2022 | Lopez | G11B 27/102 |

FOREIGN PATENT DOCUMENTS

| JP | 2017-199352 A | 11/2017 |
| JP | 2019-109785 A | 7/2019 |
| JP | 2020-0039029 A | 3/2020 |

(Continued)

OTHER PUBLICATIONS

"Harnessing the Power of Data in Live Commerce: 'Live data Insight' of Shoplive" (published Dec. 28, 2023 at https://www.shoplive.cloud/blog-posts-en/data-insight) (Year: 2023).*

(Continued)

*Primary Examiner* — James M Detweiler
(74) *Attorney, Agent, or Firm* — Chun-Ming Shih; HDLS IPR SERVICES

(57) ABSTRACT

A terminal includes one or more processors, and memory storing one or more computer programs configured to be executed by the one or more processors. The one or more computer programs include instructions for: displaying an analysis screen of a livestream associated with a selling item on a display; and displaying, on the analysis screen, a first object indicating a sales activity on a livestreamer side and a second object indicating reactions on viewers side together along a same time axis.

19 Claims, 16 Drawing Sheets

(56) References Cited

FOREIGN PATENT DOCUMENTS

JP      2022-075401 A      5/2022
WO    2021/106034 A1    6/2021

OTHER PUBLICATIONS

Notice of Reasons for Refusal dated Dec. 12, 2023, issued in corresponding Japanese Patent Application No. 2023-044645 with English translation (4 pgs.).

Notification of Reasons for Refusal dated Jun. 6, 2023, issued in corresponding Japanese Patent Application No. 2023-044645 with English translation (6 pgs.).

"What is Live Commerce?", Hands Up, with English translation (27 pgs.). URL: https://handsup.17.live/live-commerce/.

\* cited by examiner

| Stream ID | Livestreamer ID | Selling Item ID | Sales Activity Data |
|---|---|---|---|
| ST01 | LV1 | PD001<br>PD002<br>PD003 | 1:00 PD001 Introduction Start<br>6:30 PD001 Introduction End<br>8:00 PD002 Introduction Start<br>… |

| Stream ID | Posting Time | Poster ID | Comment |
|---|---|---|---|
| ST01 | 1:20 | XYZ | Beautiful ! |
| ST01 | 2:15 | MMM | Look nice |
| ST01 | 2:50 | ABC | Do you have any other color? |

| Stream ID | Transmission Time | Sender ID | Effect ID |
|---|---|---|---|
| ST01 | 1:15 | MMM | EF01 |
| ST01 | 1:30 | XYZ | EF25 |
| ST01 | 1:35 | XYZ | EF25 |
| | | | |

| Stream ID | Detection Time | Viewer ID |
|---|---|---|
| ST01 | 0:05 | XYZ, ⋯ |
| ST01 | 0:10 | XYZ, ⋯ |
| ST01 | 0:15 | XYZ, MMM, ⋯ |
| ST01 | 0:20 | XYZ, MMM, ABC, ⋯ |
| | | |

| Viewer ID | Viewing History | Gender | Age | Country |
|---|---|---|---|---|
| XYZ | ST01, ST02, ST03, ··· | Male | 20s | Japan |
| MMM | ST04, ST05, ··· | Female | 30s | Japan |
| ABC | ST01, ST06, ··· | Male | 40s | Taiwan |

| Stream ID | Share Time | Sharer ID |
|---|---|---|
| ST01 | 5:35 | ABC |
| ST01 | 7:00 | ABC |
| ST01 | 9:36 | ABC |

| Stream ID | Cart-in Time | Viewer ID | Selling Item ID |
|---|---|---|---|
| ST01 | 4:22 | ABC | PD001 |
| ST01 | 4:59 | MMM | PD002 |
| ST01 | 5:19 | KKW | PD001 |

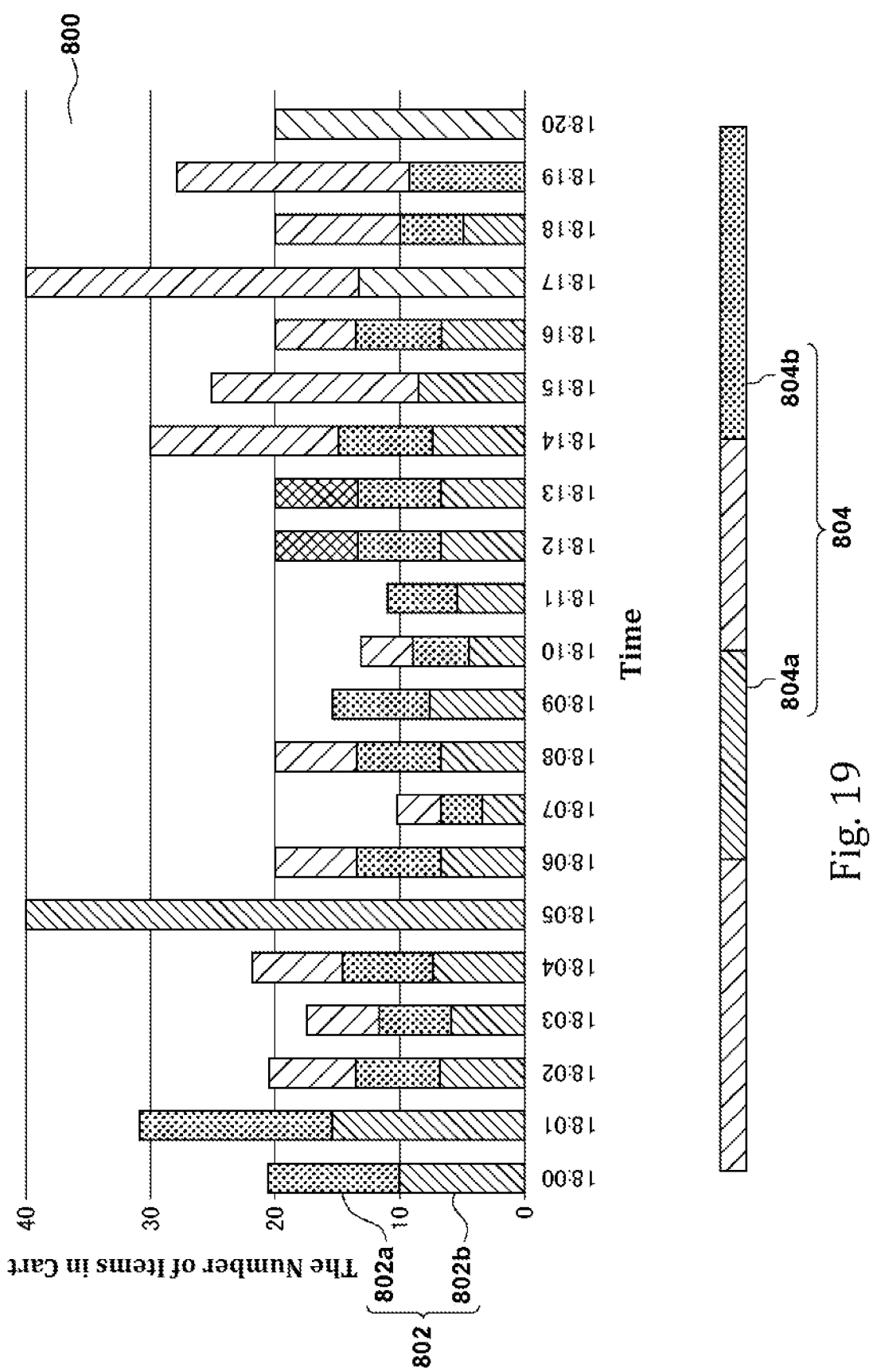

TERMINAL, METHOD, AND SERVER

CROSS-REFERENCE TO RELATED APPLICATIONS

This application is based on and claims the benefit of priority from Japanese Patent Application Serial No. 2023-44645 (filed on Mar. 20, 2023), the contents of which are hereby incorporated by reference in its entirety.

TECHNICAL FIELD

The present disclosure relates to a terminal, a method, and a server.

BACKGROUND

Live commerce (LC) is a new customer service and sales approach combining live-streams and e-commerce (EC).

The live commerce can provide users with a purchasing experience similar to that in a physical store, regardless of where the users are (see, for example, International Publication No. WO 2021/106034 ("the '034 Publication"), Japanese Patent Application Publication No. 2019-109785 ("the '785 Publication"), and "What is Live Commerce?", HandsUP, URL: https://handsup.17.live/live-commerce/("Non-patent literature 1").

In live commerce, actions of a seller (i.e., livestreamer) are directly reflected in actions of a buyer (i.e., viewer) in real time. If correlations between livestreamer's activities and viewer's reactions can be found, the livestreamer can use this knowledge to optimize his/her live commerce. However, it is not easy to find such correlations using conventional technology.

SUMMARY

The disclosure is made in view of the above and to provide a technology that makes it possible to easily find correlations between activities of a livestreamer and reactions of viewers in live commerce.

One aspect of the disclosure relates to a terminal. The terminal includes one or more processors, and memory storing one or more computer programs configured to be executed by the one or more processors. The one or more computer programs include instructions for: displaying an analysis screen of a livestream associated with a selling item on a display; and displaying, on the analysis screen, a first object indicating a sales activity on a livestreamer side and a second object indicating reactions on viewers side together along a same time axis.

Another aspect of the present disclosure relates to a server. The server includes: a relay unit adapted to transmit a video data related to the livestream from a terminal of a livestreamer side to a terminal of a viewer side, the livestream being associated with a selling item; a receiving unit adapted to receive a signal indicating sales activity on the livestreamer side during the livestream from the terminal of the livestreamer side over a network; a reaction receiving unit adapted to receive a signal indicating a reaction from the viewer side during the livestream from the terminal of the viewer side over the network; a generating unit adapted to generate an analysis screen on which a first object indicating the sales activity on the livestreamer side and a second object indicating the reaction on the viewer side are displayed together along a same time axis; and a transmission unit adapted to transmit the generated analysis screen to the terminal of the livestreamer side over the network.

It should be noted that the components described throughout this disclosure may be interchanged or combined. The components, features, and expressions described above may be replaced by devices, methods, systems, computer programs, recording media containing computer programs, etc. Any such modifications are intended to be included within the spirit and scope of the present disclosure.

ADVANTAGEOUS EFFECTS

According to the aspects of the disclosure, it is easy to find a correlation between activities on the livestreamer side and reactions on the viewers side in live commerce.

BRIEF DESCRIPTION OF THE DRAWINGS

FIG. 6 is a data structure diagram of an example of a livestream information holding unit in FIG. 5.

FIG. 7 is a data structure diagram showing an example of a comment history holding unit in FIG. 5.

FIG. 8 is a data structure diagram showing an example of an effect transmission history holding unit shown in FIG. 5.

FIG. 9 is a data structure diagram of an example of a viewer history holding unit in FIG. 5.

FIG. 10 is a data structure diagram of an example of a viewer information holding unit in FIG. 5.

FIG. 11 is a data structure diagram of an example of a share history holding unit in FIG. 5.

FIG. 12 is a data structure diagram of an example of a cart history holding unit in FIG. 5.

FIG. 19 schematically illustrates a graph display region of the number of in-cart items analysis screen of a modification example.

DESCRIPTION OF THE EMBODIMENTS

Like elements, components, processes, and signals throughout the figures are labeled with same or similar designations and numbering, and the description for the like elements will not be hereunder repeated. For purposes of clarity and brevity, some of the components that are less related and thus not described are not shown in the figures.

In a live commerce system according to an embodiment, during a livestream (hereinafter referred to as "LC livestream") for the purpose of selling goods and/or services (hereinafter referred to simply as "selling items"), an analysis screen that displays livestreamer's sales activities and viewers' reactions along the same time axis is provided to a user(s) on the livestreamer side in real time. Alternatively, the screen may be provided after the LC livestream is finished. The user(s) on the livestreamer side can understand correlations between the sales activities and the reactions by viewing the analysis screen. The user on the livestreamer side can optimize the content of the LC livestream based on the discovered correlations. The optimization can promote sales of the selling items through the live commerce system.

Figure 1:
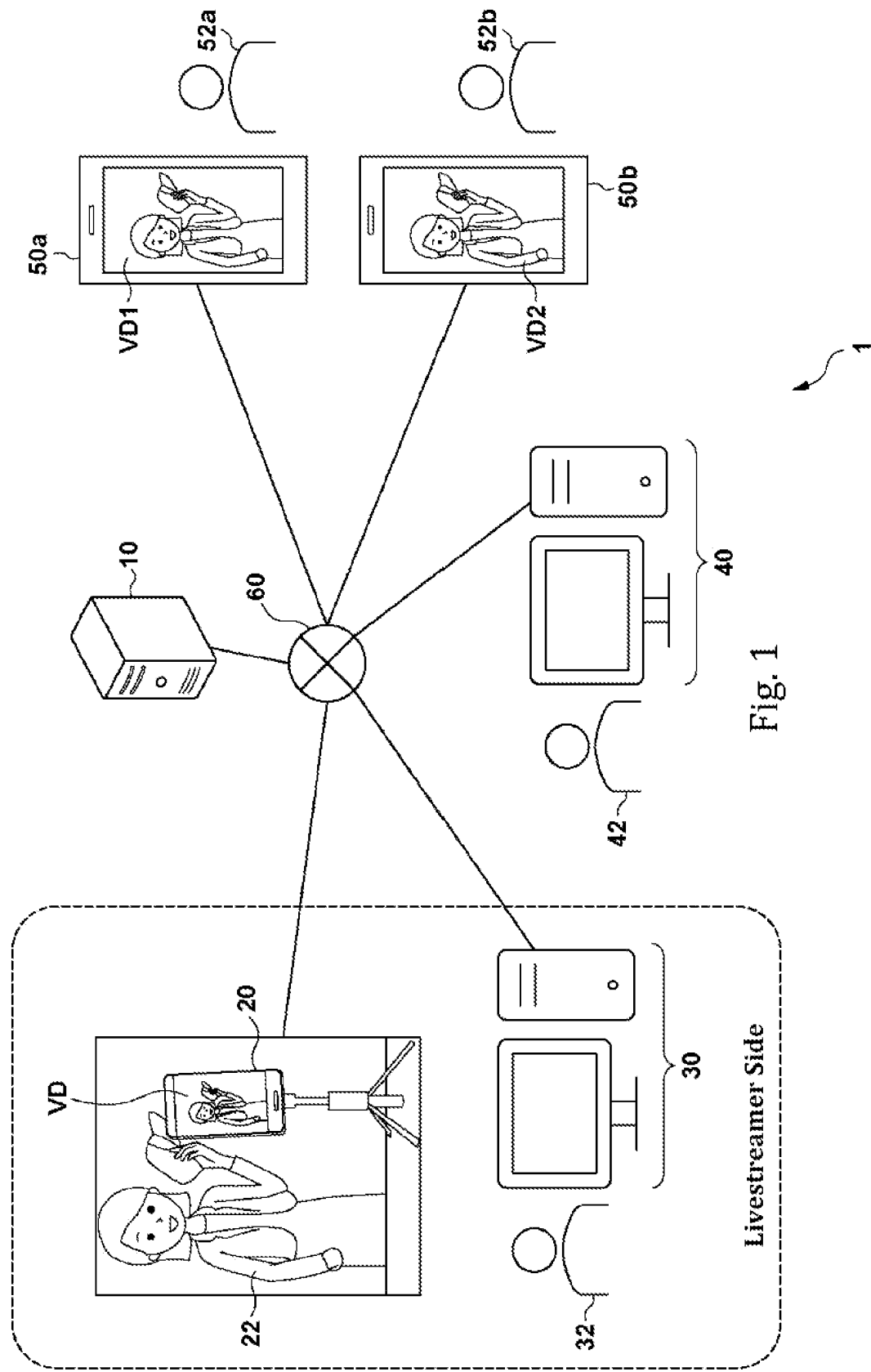
FIG. 1 schematically illustrates a configuration of a live commerce system relating to one embodiment of the disclosure.

FIG. 1 schematically illustrates a configuration of a live commerce system 1 relating to the embodiment. The live commerce system 1 includes an LC (live commerce) server 10, a livestreamer mobile terminal 20 on a livestreamer side, a livestreamer control terminal 30 on the livestreamer side, an administrator terminal 40 used by an administrator 42 of a live commerce service provided by the live commerce system 1, and viewer terminals 50 (50a, 50b . . . ) on viewers (52a, 52b . . . ) side. The LC server 10, livestreamer mobile terminal 20, livestreamer control terminal 30, administrator terminal 40, and viewer terminal 50 are interconnected by a network 60 such as the Internet. The LC server 10 may be one or more information processing devices connected to the network 60. The livestreamer mobile terminal 20 may be, for example, mobile terminal devices such as smartphones, tablets, laptop PCs, recorders, portable gaming devices, and wearable devices. The livestreamer control terminal 30 and the administrator terminal 40 may be, for example, stationary devices such as desktop PCs. The viewer terminal 50 may be, for example, mobile terminal devices such as smartphones, tablets, laptop PCs, recorders, portable gaming devices, and wearable devices, or may be stationary devices such as desktop PCs.

The livestreamer mobile terminal 20 and livestreamer control terminal 30 are terminals used on the livestreamer side. On the livestreamer side, a livestreamer 22 introduces selling items in front of the livestreamer mobile terminal 20, and a livestream operator 32 controls the content of the LC livestream through the livestreamer control terminal 30. The case in which the livestreamer side includes the livestreamer 22 and livestream operator 32 will be described in this embodiment. However, in other embodiments, a single livestreamer may use a single terminal to perform the LC livestream. In this case, the livestreamer mobile terminal 20 may have the functions of the livestreamer control terminal 30 described below.

The LC server 10 hosts an LC livestream. The LC server 10 accumulates historical data of sales activities on the livestreamer side, such as the start and end of introductions of selling items, and reactions on the viewer side, such as comments, shares, and placement of items in cart, while the LC livestream is being broadcast. The LC server 10 generates an analysis screen based on the LC livestream history data and transmits it to the livestreamer control terminal 30 over the network 60. The livestreamer control terminal 30 displays the analysis screen on the display. The livestream operator 32 draws up how to introduce the selling items based on the correlations read from the analysis shown on the screen and instructs the livestreamer 22. In other cases, the analysis screen may be generated by the livestreamer control terminal 30.

As used herein, the term "live-streaming (livestreaming)" or "livestream (livestream)" may mean a mode of data transmission that allows a content recorded at a user terminal of a streamer to be played and viewed at user terminals of viewers substantially in real time, or it may mean a live broadcast realized by such a mode of transmission. The live-streaming may be achieved using existing live-streaming technologies such as HTTP Live Streaming, Common Media Application Format, Web Real-Time Communications, Real-Time Messaging Protocol and MPEG DASH. The live-streaming includes a transmission mode in which, while a streamer is recording contents, viewers can view the contents with a certain delay. The delay is acceptable as long as interaction between the streamer and the viewers can be at least established. Note that the live-streaming is distinguished from so-called on-demand distribution, in which contents are entirely recorded and the entire data is once stored on the server and the server provides users with the data at any subsequent time upon request from the users.

The term "video data" herein refers to data that includes image data (also referred to as moving image data) generated using an image capturing function of the livestreamer mobile terminal 20 and audio data generated using an audio input function of the livestreamer mobile terminal 20. The video data is reproduced at the viewer terminal 50, so that the viewer can view the contents.

In the example of FIG. 1, the livestreamer 22 introduces a selling item in the LC livestream. The livestreamer mobile terminal 20 of the livestreamer 22 generates video data by recording images and sounds of the livestreamer 22, and the generated data is transmitted to the LC server 10 over the network 60. At the same time, the livestreamer mobile terminal 20 and livestreamer control terminal 30 display the recorded video image VD of the livestreamer 22 on their displays to allow the livestreamer side (the livestreamer 22 and livestream operator 32) to check what is to be streamed.

The viewer terminals 50a and 50b of the viewers 52a and 52b respectively, who have requested the platform to enable them to view the LC livestream of the livestreamer 22, receive video data related to the LC livestream over the network 60 and reproduce the received video data, to display video images VD1 and VD2 on the displays and output audio through the speakers. The video images VD1 and VD2 displayed at the viewer terminals 50a and 50b, respectively, are substantially the same as the video image VD captured by the livestreamer mobile terminal 20 of the livestreamer 22, and the audio outputted at the viewer terminals 50a and 50b is substantially the same as the audio recorded by the livestreamer mobile terminal 20 of the livestreamer 20.

Recording of the images and sounds at the livestreamer mobile terminal 20 of the livestreamer 22 and reproduction of the video data at the viewer terminals 50a and 50b of the viewers 52a and 52b are performed substantially simultaneously. When one viewer 52a enters a question on the viewer terminal 50a about a selling item introduced by the livestreamer 22, the LC server 10 displays the question on the livestreamer mobile terminal 20 of the livestreamer 22 and the livestreamer control terminal 30 of the livestream operator 32 in real time, and also on the viewer terminals 50a and 50b of the viewers 52a and 52b, respectively. When the livestreamer 22 answers to the question, the video image and audio of the answer are outputted on the viewer terminals 50a and 50b of the viewers 52a and 52b, and this is recognized as a conversation between the livestreamer 22 and the viewer 52a is established. In this way, the LC livestreaming realizes the livestreaming that enables the interactive communication, not one-way communication.

Figure 2:
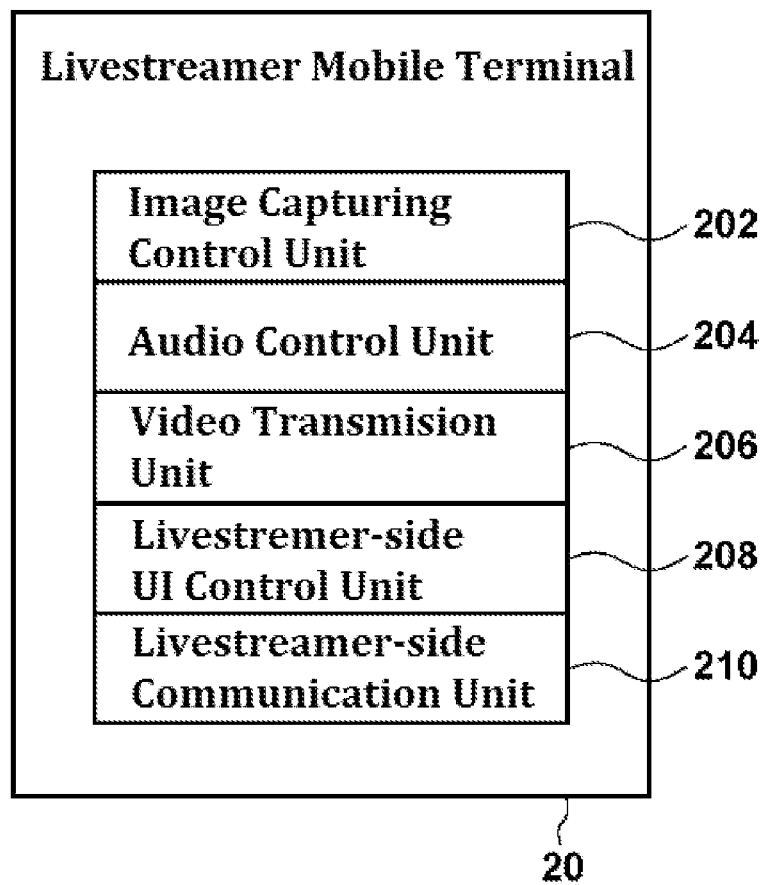
FIG. 2 is a block diagram showing functions and configuration of a livestreamer mobile terminal of FIG. 1.

FIG. 2 is a block diagram showing functions and configuration of the livestreamer mobile terminal 20 of FIG. 1. The blocks in FIG. 2 and the subsequent block diagrams may be realized by elements such as a computer CPU or a mechanical device in terms of hardware, and can be realized by a computer program or the like in terms of software. The blocks shown in the drawings are, however, functional blocks realized by cooperative operation between hardware and software. Therefore, it is understood by those skilled in the art that these functional blocks can be realized in various forms by combining hardware and software.

The livestreamer 22 downloads and installs an application program according to the embodiment onto the livestreamer mobile terminal 20 from a download site over the network 60. Alternatively, the application may be pre-installed on the livestreamer mobile terminal 20. When the application is executed on the livestreamer mobile terminal 20, the livestreamer mobile terminal 20 communicates with the LC server 10 over the network 60 to implement various functions. Hereinafter, the functions implemented by (processors such as a CPU of) the livestreamer mobile terminal 20 by running the application will be described as functions of the livestreamer mobile terminal 20. In practice, those functions are realized by the application program executed on the livestreamer mobile terminal 20. In any other embodiments, these functions may be realized by a computer program that is written in a programming language such as HTML (HyperText Markup Language), transmitted from the LC server 10 to a web browser of the livestreamer mobile terminal 20 over the network 60, and executed by the web browser. Similarly, the livestreamer operator 32 installs the application program on the livestreamer control terminal 30, and the viewer installs an application program on the viewer terminal 50.

The livestreamer mobile terminal 20 generates video data by recording images and sounds of the livestreamer 22, and transmits the generated data to the LC server 10. The livestreamer mobile terminal 20 includes an image capturing control unit 202, an audio control unit 204, a video transmission unit 206, a livestreamer-side UI control unit 208, and a livestreamer-side communication unit 210. The image capturing control unit 202 is connected to a camera (not shown in FIG. 2) and controls image capturing performed by the camera. The image capturing control unit 202 obtains image data from the camera. The audio control unit 204 is connected to a microphone (not shown in FIG. 2) and controls audio input from the microphone. The audio control unit 204 obtains audio data through the microphone. The video transmission unit 206 transmits video data including the image data obtained by the image capturing control unit 202 and the audio data obtained by the audio control unit 204 to the LC server 10 over the network 60. The video data is transmitted by the video transmission unit 206 in real time. That is, the generation of the video data by the image capturing control unit 202 and the audio control unit 204, and the transmission of the generated video data by the video transmission unit 206 are performed substantially at the same time.

The livestreamer-side UI control unit 208 controls a UI for the livestreamer 22. The livestreamer-side UI control unit 208 is connected to a display (not shown in FIG. 2), and displays a video on the display by reproducing the video data that is to be transmitted by the video transmission unit 206. The livestreamer-side UI control unit 208 is also connected to input means (not shown in FIG. 2) such as touch panels, keyboards, and displays, and obtains inputs made by the livestreamer 22 via the input means. The livestreamer-side UI control unit 208 superimposes a predetermined frame image on the video image. The frame image may include various user interface objects (hereinafter simply referred to as "objects") for receiving inputs from the livestreamer 22, comments entered by the viewers, and information obtained from the LC server 10.

The livestreamer-side communication unit 210 controls communication with the LC server 10 during an LC livestream. The livestreamer-side communication unit 210 transmits the content of the input made by the livestreamer 22 and that has been obtained by the livestreamer-side UI control unit 208 to the LC server 10 over the network 60. The livestreamer-side communication unit 210 receives various information associated with the livestream from the LC server 10 over the network 60.

Figure 3:
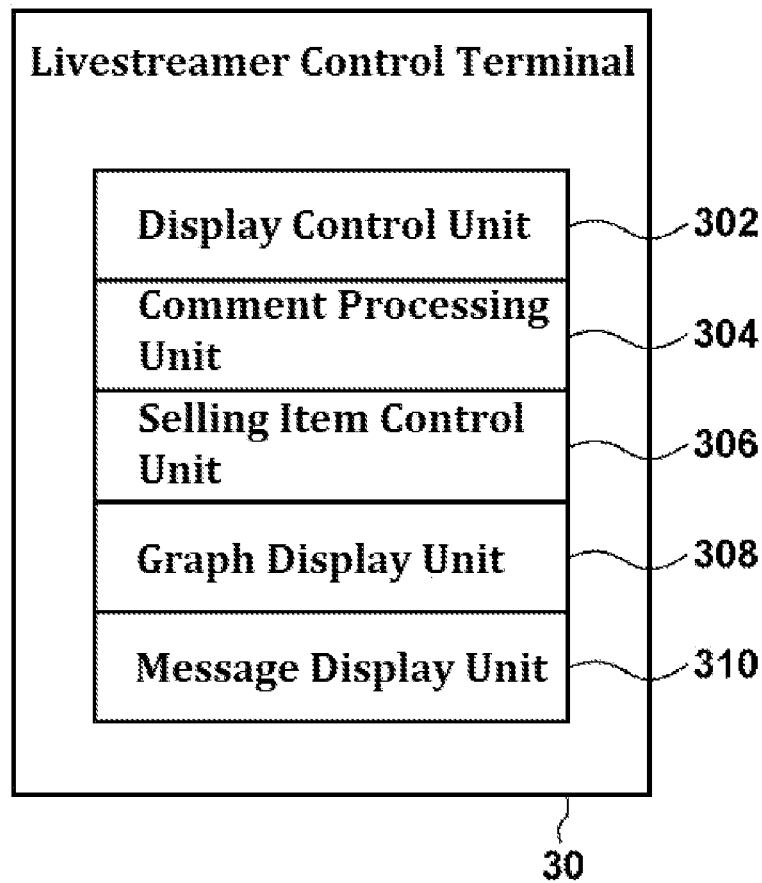
FIG. 3 is a block diagram showing functions and configuration of a livestreamer control terminal of FIG. 1.

FIG. 3 is a block diagram showing functions and configuration of the livestreamer control terminal 30 of FIG. 1. The livestreamer control terminal 30 cooperates with the livestreamer mobile terminal 20 over the network 60 to provide an LC livestream. The livestreamer control terminal 30 includes a display control unit 302, a comment processing unit 304, a selling item control unit 306, a graph display unit 308, and a message display unit 310.

The display control unit 302 generates a livestream control screen for controlling the contents of the LC livestream and displays the control screen on the display of the livestreamer control terminal 30. The display control unit 302 causes an analysis screen of an LC livestream associated with a selling item(s) to be displayed on the display of the livestreamer control terminal 30. The analysis screen includes a user trend analysis screen that displays activities to introduce selling items performed by the livestreamer together with actions of viewers. The analysis screen also includes a number of in-cart items analysis screen, which displays the activities to introduce selling items performed by the livestreamer together with the number of actions performed by the viewers to order the selling items.

The comment processing unit 304 displays, on the livestream control screen, comments entered by the viewers 52 of the LC livestream at the viewer terminals 50. The comment processing unit 304 also accepts input of comments by the livestream operator 32. The comment processing unit 304 generates a comment input signal including the livestreamer ID of the livestreamer and the inputted comment, and transmits the signal to the LC server 10 over the network 60.

The selling item control unit 306 controls selling items to be introduced in the LC livestream. Upon reception of an instruction to start introducing a selling item on the livestream control screen, the selling item control unit 306 generates an introduction start request signal including a selling item ID of the selling item to be introduced and transmits it to the LC server 10 over the network 60. Upon reception of an instruction to end introducing the selling item on the livestream control screen, the selling item control unit 306 generates an introduction end request signal including the selling item ID of a selling item for which its introduction ends and transmits it to the LC server 10 over the network 60.

The graph display unit 308 displays a sales object indicating the sales activities on the livestreamer side and a reaction object indicating reactions on the viewers side together on the analysis screen along the same time axis. The horizontal axis of the graph displayed by the graph display unit 308 is time streamed or streaming time, which is a time period starting from the start of the livestream. The graph displays the sales object and the reaction object superimposed on the graph. The graph may be generated by an analysis screen generating unit 110 or by the graph display unit 308.

The message display unit 310 displays messages from the administrator 42 on the analysis screen in real time.

In this embodiment, the livestream operator 32 starts and ends the introduction of the selling item(s) and also responds to comments through the livestreamer control terminal 30, but in other embodiments, the livestreamer control terminal 30 may issue coupons and receive a discount request.

Figure 4:
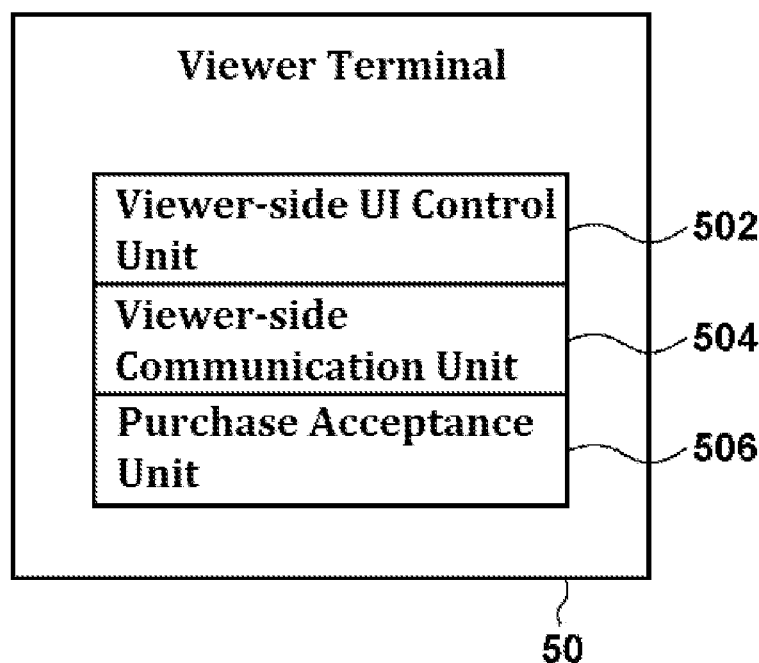
FIG. 4 is a block diagram showing functions and configuration of a viewer terminal of FIG. 1.

FIG. 4 is a block diagram showing functions and configuration of the viewer terminal 50 of FIG. 1. The viewer terminal 50 obtains video data related to the LC livestream from the LC server 10 and reproduces the obtained video data. The viewer terminal 50 includes a viewer-side UI control unit 502, a viewing-side communication unit 504, and a purchase acceptance unit 506. The viewer-side communication unit 504 controls communication with the LC server 10 during a LC livestream. The viewer-side communication unit 504 receives video data related to the LC livestream from the LC server 10 over the network 60.

The viewer-side UI control unit 502 controls the UI for the viewer. The viewer-side UI control unit 502 is connected to a display and a speaker (not shown in FIG. 2), and reproduces the received video data so that video images are displayed on the display and sounds are output through the speaker. The state where the images and sounds are respectively output through the display and speaker can be referred to as "the video data is reproduced". The viewer-side UI control unit 502 is also connected to input means (not shown in FIG. 2) such as touch panels, keyboards, and displays, and obtains viewer's input via the input means. The viewer-side UI control unit 502 superimposes a predetermined frame image on an image generated from the video data obtained from the LC server 10. The frame image includes various objects for receiving inputs from the viewer, comments entered by the viewer and livestreamer, and information generated by the LC server 10.

The viewer-side communication unit 504 transmits the content of the viewer's input that has been obtained by the viewer-side UI control unit 502 to the LC server 10 over the network 60. The input by a viewer may includes input of a comment, a request to display an effect, and a request to share the LC livestream. When a comment is inputted by a viewer, the viewer-side communication unit 504 generates a comment input signal including the viewer ID of the viewer and the comment, and transmits the signal to the LC server 10 over the network 60. When a viewer makes a request to display an effect, the viewer-side communication unit 504 generates an effect display request signal including the viewer ID of the viewer who requested and an effect ID identifying the effect, and transmits the signal to the LC server 10 over the network 60. When a share request is made by a viewer, the viewer-side communication unit 504 generates a share request signal including the viewer ID of the viewer who requested and transmit the signal to the LC server 10 over the network 60.

The purchase acceptance unit 506 receives an instruction from a viewer to purchase a selling item associated with the LC livestream. Viewers viewing the LC livestream perform a predetermined action or operation to order a desired selling item. The purchase acceptance unit 506 accepts this predetermined action or operation as an instruction to purchase the item. The predetermined action or operation may be, for example, to tap a thumbnail of the selling item displayed on the LC livestream screen. Alternatively, the predetermined action or operation may be to select the desired selling item from a list of selling items. Alternatively, the predetermined action or operation may be a series of inputs to place the desired selling item in cart (cart-in). Alternatively, the predetermined action or operation may be to order the selling item or to complete payment for the purchase of the selling item. When the purchase acceptance unit 506 accepts the predetermined action or operation, it generates a purchase request signal including the viewer ID of the viewer who performed the predetermined action and the selling item ID of the selling item for which the predetermined action has been performed, and transmits the signal to the LC server 10 over the network 60.

Figure 5:
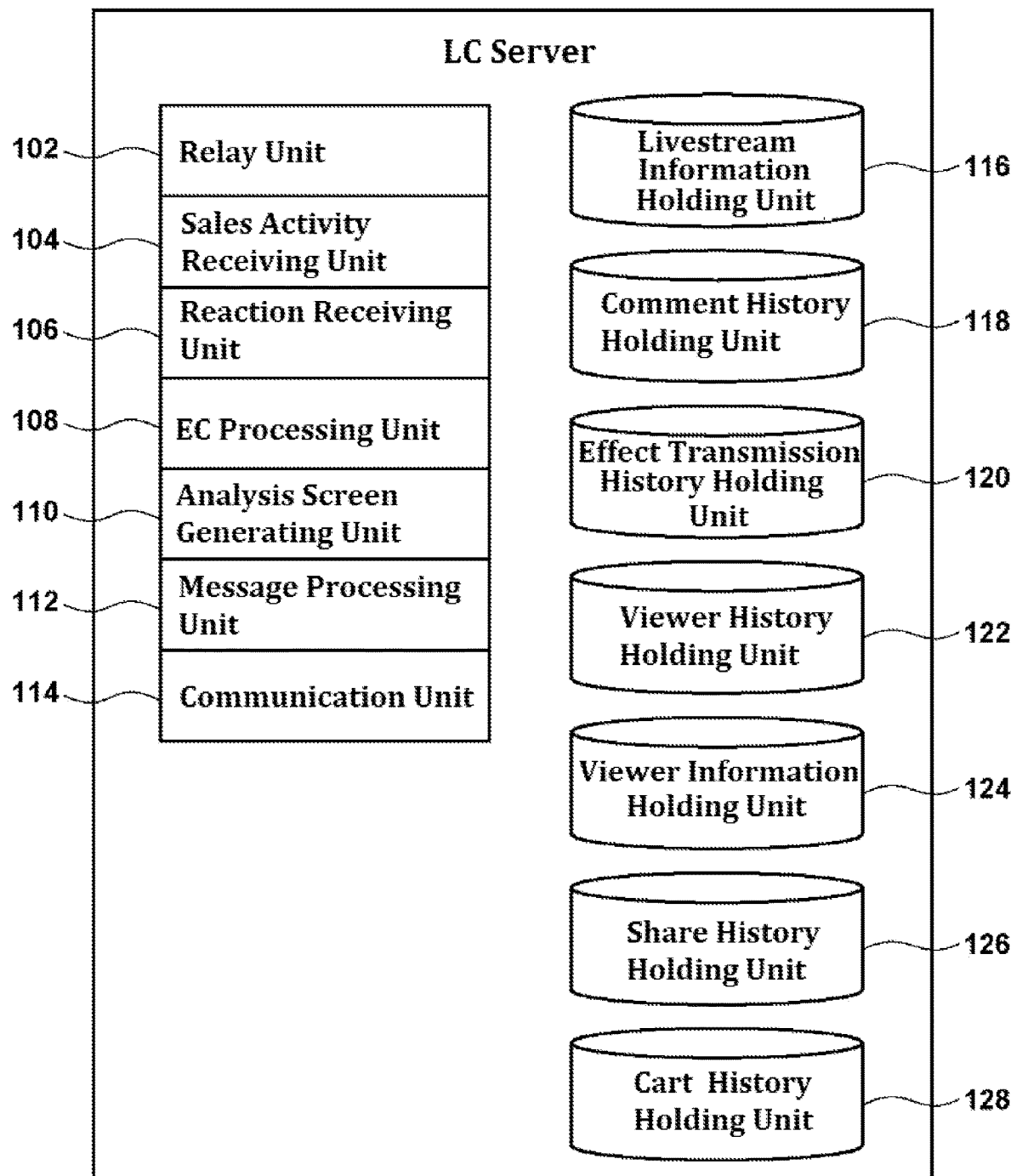
FIG. 5 is a block diagram showing functions and configuration of an LC server shown in FIG. 1.

FIG. 5 is a block diagram showing functions and configuration of the LC server 10 shown in FIG. 1. The LC server 10 includes a relay unit 102, a sales activity receiving unit 104, a reaction receiving unit 106, an EC processing unit 108, the analysis screen generating unit 110, a message processing unit 112, a communication unit 114, a livestream information holding unit 116, a comment history holding unit 118, an effect transmission history holding unit 120, a viewer history holding unit 122, a viewer information holding unit 124, a share history holding unit 126, and a cart history holding unit 128.

FIG. 6 is a data structure diagram of an example of the livestream information holding unit 116 shown in FIG. 5. The livestream information holding unit 116 holds information on past LC livestreams and LC livestreams that are currently being broadcast. The livestream information holding unit 116 stores a stream ID for identifying a livestream on the livestream platform provided by the live commerce system 1, the livestreamer ID, which is the user ID for identifying the livestreamer who provides the LC livestream, a selling item ID for identifying a selling item that can be purchased through the LC livestream, and sales activity data in the LC livestream, in association with each other.

The livestreamer ID may identify the livestreamer or a group to which the livestreamer belongs (e.g., a company). When multiple selling items are sold in the LC livestream, multiple selling items IDs are registered in association with the stream ID.

The sales activity data is data indicating sales activities performed on the livestreamer side in the LC live stream. In the embodiment, the sales activity data includes data indicating activities related to the introduction of selling items in the LC livestream. In the example of FIG. 6, the sales activity data includes data indicating when and which selling item the livestreamer side starts introducing, and data indicating when and which selling item the livestreamer side ends introducing.

FIG. 7 is a data structure diagram showing an example of the comment history holding unit 118 in FIG. 5. The comment history holding unit 118 holds the stream ID, posting time, which is the time when a comment was posted in the LC livestream identified by the stream ID, a poster ID for identifying the viewer or livestreamer who posted the comment, and the comment, in association with each other.

FIG. 8 is a data structure diagram showing an example of the effect transmission history holding unit 120 shown in FIG. 5. The effect transmission history holding unit 120 holds the stream ID, transmission time, which is the time when an effect was transmitted (used) in the LC livestream identified by the stream ID, a sender ID for identifying the viewer who transmitted the effect, and an effect ID for identifying the effect, in association with each other.

FIG. 9 is a data structure diagram of an example of the viewer history holding unit 122 in FIG. 5. The viewer history holding unit 122 holds the stream ID, detection time, which is the time when a viewer is detected in the LC livestream identified by the stream ID, and the viewer IDs for identifying viewers who are watching the LC livestream at the detection time.

FIG. 10 is a data structure diagram of an example of the viewer information holding unit 124 in FIG. 5. The viewer information holding unit 124 holds a viewer ID, a viewing history including information on LC livestreams viewed in the past by the viewer identified by the viewer ID, and the attributes (gender, age, country of residence) of the viewer. The viewing history includes the livestreamer IDs for identifying the livestreamers of the LC livestreams that the corresponding viewer viewed in the past. The viewing history may be updated each time the corresponding viewer views a new LC livestream. The attributes of the viewer may be obtained when the corresponding viewer registers with the live commerce platform and the attributes may be stored in the viewer information holding unit 124.

FIG. 11 is a data structure diagram of an example of the share history holding unit 126 in FIG. 5. The share history retention part 126 holds the stream ID, share time, which is the time the LC livestream is shared in the LC livestream identified by the stream ID, and a sharer ID, which identifies the viewer who shared the LC livestream. Sharing is realized when a viewer provides information on the LC livestream to a system or service (e.g., a social network service (SNS), messaging service, or push notification service) other than the live commerce platform. The technology to realize such sharing is publicly known and will not be described herein.

FIG. 12 is a data structure diagram of an example of the cart history holding unit 128 in FIG. 5. The cart history holding unit 128 holds the stream ID, cart-in time, which is the time when a selling item is placed in cart in the LC livestream identified by the stream ID, the viewer ID for identifying the viewer who placed the selling item in cart, and the selling item ID for identifying the selling item placed in cart, in association with each other. In the example of FIG. 12, the data held in the first row indicates that viewer "ABC" placed a selling item "PD001" in cart at 4 minutes and 22 seconds of an LC livestream "ST01".

Referring again to FIG. 5, the relay unit 102 relays the video data related to the LC livestream from the livestream mobile terminal 20 of the livestreamer 22 to the viewer terminal 50 of the viewer 52. The relay unit 102 receives from the viewer-side communication unit 504 a signal that represents user input by the viewer during the LC livestream or reproduction of the video data. The signal that represents the user input may be an object specifying signal for specifying one of the objects displayed on the display of the viewer terminal 50.

The EC processing unit 108 performs processing related to electronic commerce transaction in the LC livestream. The EC processing unit 108 allows viewers to purchase selling items in the LC livestream. The EC processing unit 108 performs processing related to the cart in the LC livestream. The EC processing unit 108 may be realized using known technologies described in, for example, the '034 Publication, the '785 Publication, and Non-patent literature 1. Also, entering and reflecting comments, registering and introducing selling items, placing the items in cart and ordering them, and sending and reflecting effects in the embodiment may also be realized using, for example, the known technologies described in the '034 Publication, the '785 Publication, and Non-patent literature 1.

The sales activity receiving unit 104 receives signals indicating sales activities on the livestreamer side during the LC livestream from the livestreamer terminal (livestreamer mobile terminal 20, livestreamer control terminal 30) over the network 60. The sales activity receiving unit 104 updates the livestream information holding unit 116 in response to receipt of the signal indicating a sales activity.

The sales activity receiving unit 104 receives a request signal for starting introduction from the livestreamer control terminal 30 over the network 60 during the LC livestream. The sales activity receiving unit 104 updates the livestream information holding unit 116 to add data indicating that introduction of the selling item specified by the selling item ID included in the signal has started at the time when the signal was received or when the signal was generated in the livestreamer control terminal 30. The data is added to the sales activity data of the LC livestream identified by the stream ID.

The sales activity receiving unit 104 receives a request signal for ending introduction from the livestreamer control terminal 30 over the network 60 during the LC livestream. The sales activity receiving unit 104 updates the livestream information holding unit 116 to add data indicating that the introduction of the selling item specified by the selling item ID included in the signal has ended at the time when the signal was received or when the signal was generated in the livestreamer control terminal 30. The data is added to the sales activity data of the LC livestream identified by the stream ID.

The reaction receiving unit 106 receives signals indicating reactions from the viewer side during the LC livestream from the livestreamer terminal 50 over the network 60. The reaction receiving unit 106 updates the comment history holding unit 118, effect transmission history holding 120, viewer history holding unit 122, share history holding unit 126, and cart history holding unit 128 in response to receipt of the signal indicating a reaction.

The reaction receiving unit 106 receives the comment input signal from the viewer terminal 50 or the livestreamer control terminal 30 over the network 60 during the LC livestream. The reaction receiving unit 106 registers, in the comment history holding unit 118, data indicating that the viewer identified by the viewer ID included in the signal entered a comment included in the signal in the LC livestream at the time when the signal was received or when the signal was generated.

The reaction receiving unit 106 receives the effect display request signal from the viewer terminal 50 over the network 60 during the LC livestream. The reaction receiving unit 106 registers, in the effect transmission history holding 120, data indicating that the viewer identified by the viewer ID included in the signal sends the effect identified by the effect ID included in the signal in the LC livestream at the time when the signal was received or when the signal was generated.

The reaction receiving unit 106 detects a viewer(s) participating in the LC livestream periodically and registers the detected viewer(s) in the viewer history holding unit 122. The reaction receiving unit 106 generates a list of viewers who are watching the LC livestream, for example, once every 5 seconds, and registers the list in the viewer history holding unit 122.

The reaction receiving unit 106 receives the share request signal from the viewer terminal 50 over the network 60 during the LC livestream. The reaction receiving unit 106 registers, in the share history holding unit 126, data indicating that the viewer identified by the viewer ID included in the signal shared the LC livestream at the time when the signal was received or when the signal was generated.

The reaction receiving unit 106 receives the purchase request signal from the viewer terminal 50 over the network 60 during the LC livestream. The reaction receiving unit 106 registers, in the cart history holding unit 128, data indicating that the viewer identified by the viewer ID included in the signal placed the selling item identified by the selling item ID included in the signal in the LC livestream at the time when the signal was received or when the signal was generated.

The analysis screen generating unit 110 generates the analysis screen that displays the sales object indicating the sales activities on the livestreamer side and the reaction object indicating reactions on the viewers side together along the same time axis. The analysis screen generating unit 110 generates the analysis screen by referring to the livestream information holding unit 116, comment history holding unit 118, effect transmission history holding unit 120, viewer history holding unit 122, viewer information holding unit 124, share history holding unit 126, and cart history holding unit 128. The generated analysis screen will be described below.

The message processing unit 112 receives messages from the administrator terminal 40 of the administrator 42 over the network 60. The messages include suggestions or warnings to the livestreamer side by the administrator 42 who is watching the LC livestream at the administrator terminal 40. The message processing unit 112 may automatically generate such messages by analyzing the content of the LC livestream according to a predetermined algorithm.

The communication unit 114 transmits the analysis screen data generated by the analysis screen generating unit 110 to the livestreamer control terminal 30 of the livestreamer side over the network 60. The communication unit 114 transmits the messages received or generated by the message processing unit 112 to the livestreamer control terminal 30 on the livestreamer side over the network 60.

Figure 13:
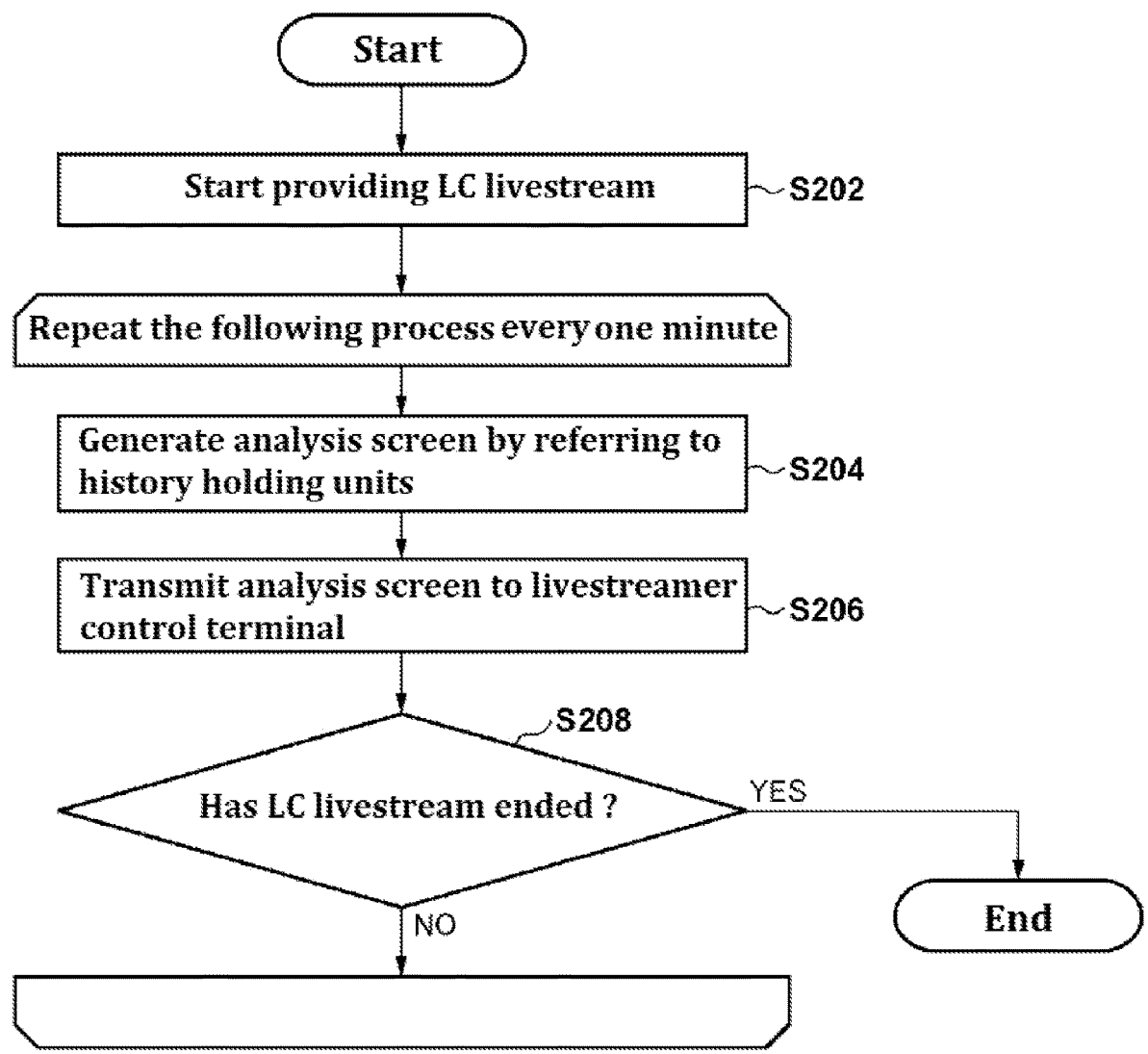
FIG. 13 is a flow chart of a series of steps performed in the live commerce system when updating an analysis screen during an LC livestream.

The operation of the live commerce system 1 with the above configuration will be now described. FIG. 13 is a flow chart of a series of steps performed in the live commerce system 1 when updating the analysis screen during the LC livestream. When the livestreamer side starts an LC livestream, the LC server 10 starts providing the LC livestream to viewers (S202). While the LC livestream is being broadcast, the LC server 10 repeats the following process at predetermined intervals, e.g., at one minute intervals. The LC server 10 generates the analysis screen by referring to various history holding units (the comment history holding unit 118, the effect transmission history holding unit 120, the viewer history holding unit 122, the share history holding unit 126, and the cart history holding unit 128) (S204). The LC server 10 transmits the analysis screen generated in step S204 to the livestreamer control terminal 30 (S206). The LC server 10 determines whether the LC livestream has ended (S208). When it is determined that the LC livestream has ended (YES in S208), the process is terminated. When it is determined that the livestream has not ended (NO in S208), the process returns to step S204 one minute later.

Figure 14:
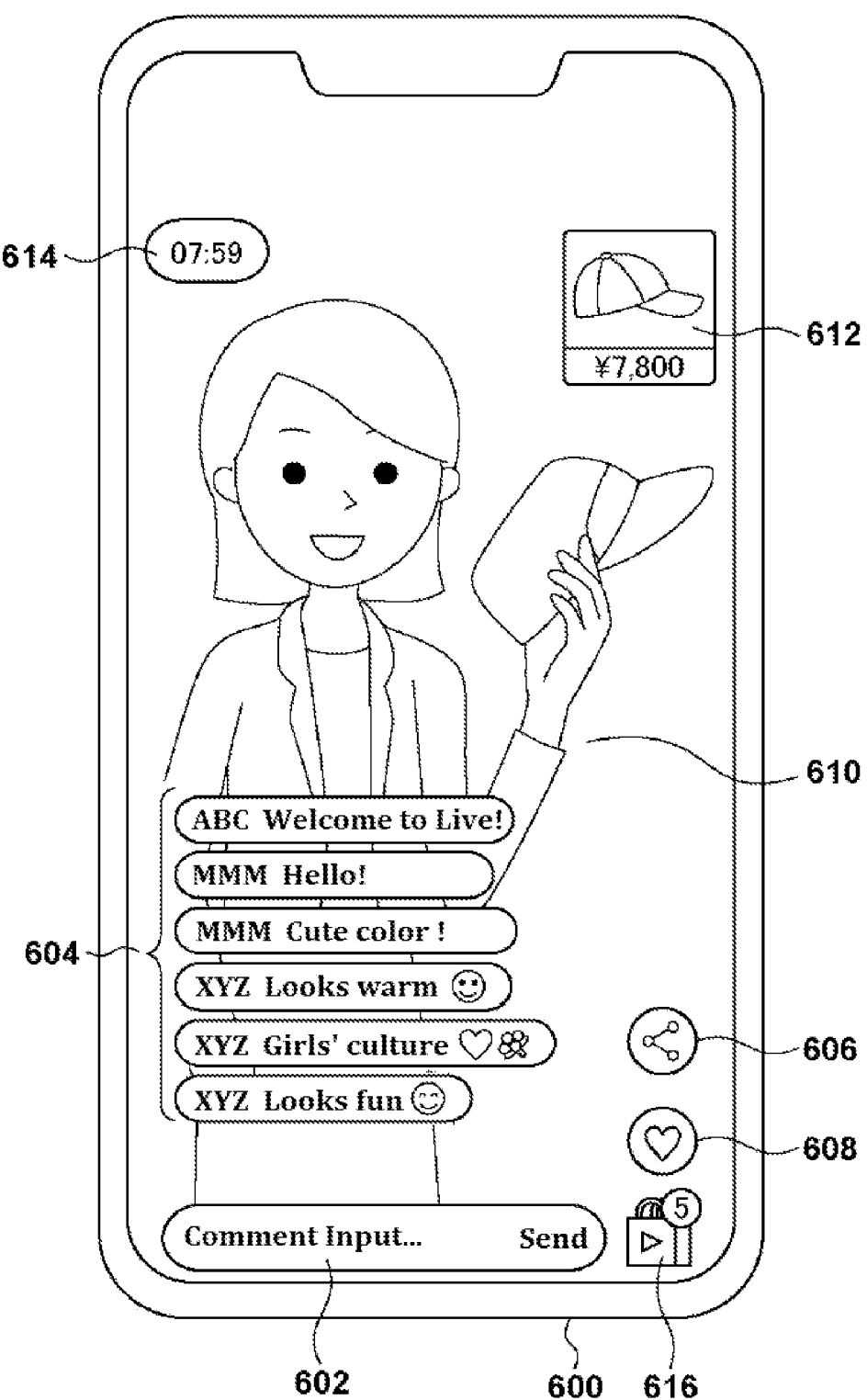
FIG. 14 is a representative screen image of a livestream screen displayed on a display of the viewer's user terminal.

FIG. 14 is a representative screen image of a livestream screen 600 displayed on the display of the viewer user terminal 50 of the viewer 52. The livestream screen 600 displays the video image generated by the livestreamer mobile terminal 20 of the livestreamer 22 in real time and has a cart function that allows viewers to purchase the selling items. The livestream screen 600 includes a comment input region 602, a comment display region 604, a share button 606, a heart button 608, a video image 610 of the livestreamer 22 obtained by reproducing the video data received from the LC server 10, a thumbnail 612, a time display region 614 for indicating time streamed of the LC livestream, and a cart icon 616. The viewer-side UI control unit 502 superimposes these objects on the video image 610 obtained by reproducing the video data to generate the livestream screen 600.

The comment input region 602 accepts comment input by the viewer 52. The viewer 52 enters his/her comment in the comment input region 602 and taps a send button. Upon detection of the tap on the send button, the viewer-side communication unit 504 generates the comment input signal that includes the comment entered in the comment input region 602, and transmits the signal to the LC server 10 over the network 60.

The comment display region 604 may include a comment entered by the viewer, a comment(s) entered by the livestreamer side, and a notification(s) from the system. The notification from the system includes a message indicating that a viewer has purchased a selling item. The viewer-side UI control unit 502 generates the comment display region 604 that includes the comment to be displayed that is received from the LC server 10.

The share button 606 is an object for receiving share requests by viewers. When the viewer-side UI control unit 502 detects a tap on the share button 606, it displays on the livestream screen 600 a list of candidate external services through which the LC livestream can be shared. The viewer-side communication unit 504 generates a share request including the viewer ID of the requester viewer and information on the selected external service and transmit the request to the LC server 10 over the network 60.

The heart button 608 is an object for accepting a heart effect display request by a viewer. When the viewer-side communication unit 504 detects a tap on the heart button 608, it generates an effect display request signal including the viewer's viewer ID and transmits it to the LC server 10 over the network 60. Upon reception of the effect display request signal, the LC server 10 transmits an effect display instruction to the terminals of all participants (including the livestreamer side and viewer side) participating in the LC livestreams. Upon reception of the effect display instruction from the LC server 10, the viewer-side UI control unit 502 displays a heart-shaped effect (heart effect) on the livestream screen 600. The heart effect can be used to spice up the LC stream. This example describes a case where the effect is the heart effect, but in other cases, multiple types of effects may be provided for viewers to choose from. In such cases, the effect display request signal includes an effect ID for identifying the selected effect.

The thumbnail 612 is a thumbnail indicating the selling item currently being introduced in the LC livestream. The LC server 10 displays the thumbnail 612 representing the selling item currently being introduced on the livestream screen 600 of the LC livestream after the reception of the introduction start request for the selling item from the livestreamer side until the server 10 receives the introduction end request. Upon detection of a tap on the thumbnail 612, the purchase acceptance unit 506 generates a purchase request signal to place the corresponding selling item in cart and transmits the signal to the LC server 10 over the network 60. Alternatively, the purchase acceptance unit 506 may, upon detection of a tap on the thumbnail 612, display a screen that describes details of the corresponding selling item on the display and receive the instruction to place the selling item in cart on the screen.

The cart icon 616 is an icon that takes the viewer to a screen that displays a list of the selling items that have been placed in cart. The viewer is able to proceed to the purchase process from this screen. When the viewer swipes up from the bottom of the livestream screen 600, the viewer-side UI control unit 502 superimposes on the livestream screen 600 a list including selling items that have been introduced or scheduled to be introduced in the LC livestream and selling items that will not be introduced but related to the content of the LC livestream. When the viewer selects a desired selling item in the list, the purchase acceptance unit 506 performs a process to place the selected item in cart. These functions related to the cart and purchase procedure may be realized using known e-commerce technologies.

Figure 15:
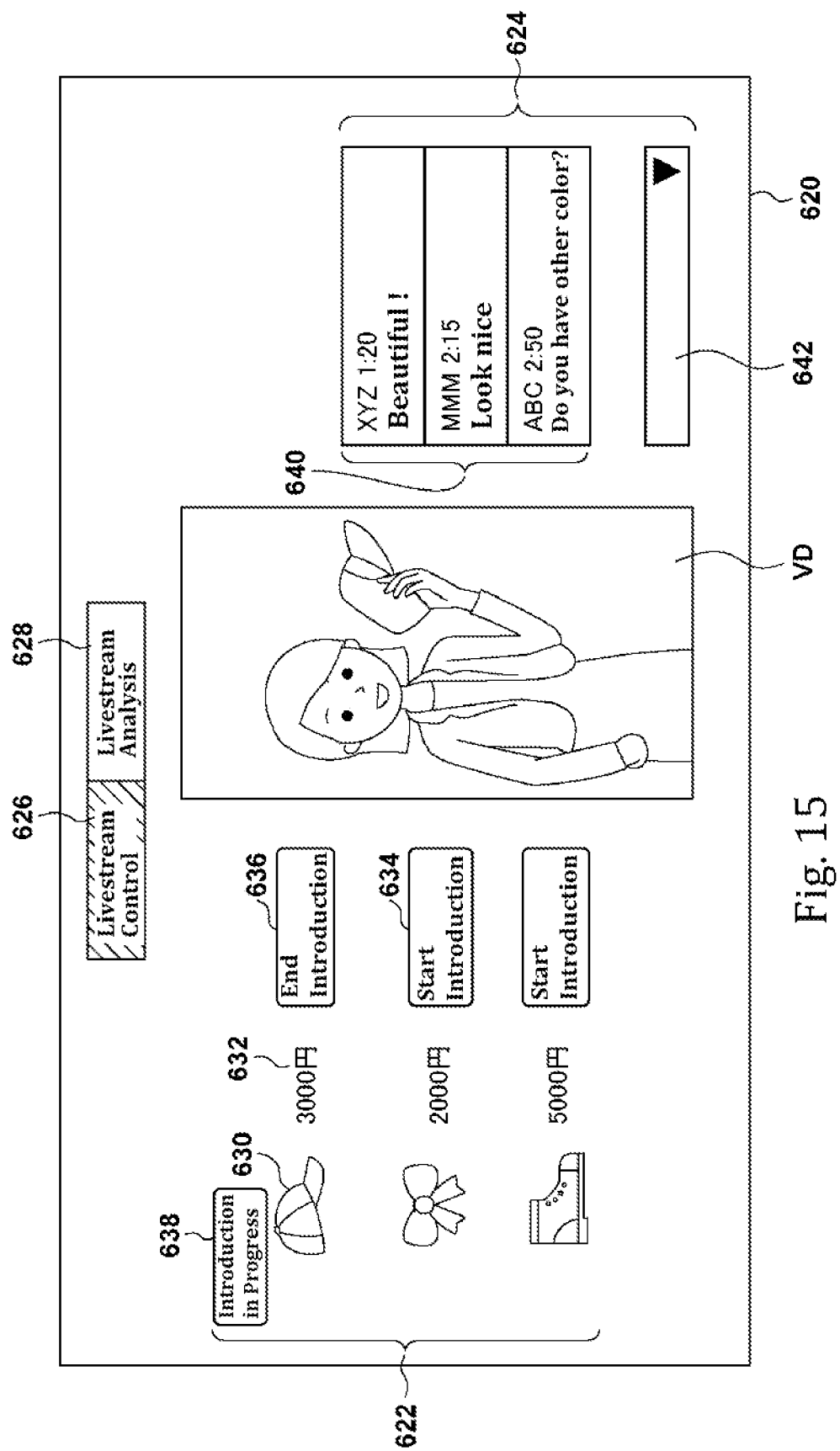
FIG. 15 is a representative screen image of a livestream control screen displayed on a display of the livestreamer control terminal of a livestream operator.

FIG. 15 is a representative screen image of a livestream control screen 620 displayed on a display of the livestreamer control terminal 30 of the livestream operator 32. The display control unit 302 works in conjunction with the comment processing unit 304, and the selling item control unit 306 to display the livestream control screen 620 on the display. The livestream control screen 620 includes a video image VD of the LC livestream captured by the livestreamer mobile terminal 20 of the livestreamer 22, a selling item control region 622 for controlling selling items in the LC livestream, a comment control region 624 for controlling comments in the LC livestream, a livestream control tab button 626, and a livestream analysis tab button 628. The example of FIG. 15 shows the mode of displaying the livestream control screen 620, so the livestream control tab button 626 is highlighted.

The selling item control region 622 includes thumbnails 630 each of which represents a selling item, a price play region 632 showing the prices of the selling items, an introduction start button 634, an introduction end button 636, and an introduction in progress display region 638. In the selling item control region 622, the selling items are displayed one by one in each row. The livestream operator 32 clicks the introduction start button 634 to introduce a desired selling item at an appropriate timing while viewing the video image VD. When the selling item control unit 306 detects the click, it generates an introduction start request signal that includes the selling item ID of the corresponding selling item and transmits it to the LC server 10 over the network 60. The selling item control unit 306 also replaces the clicked introduction start button 634 of the selling item with the introduction end button 636, and displays the introduction in-progress display region 638 near the thumbnail 630. The livestream operator 32 clicks the introduction end button 636 to introduce the desired selling item at an appropriate timing while viewing the video image VD. When the selling item control unit 306 detects the click, it generates an introduction end request signal that includes the selling item ID of the corresponding selling item and transmits it to the LC server 10 over the network 60. The selling item control unit 306 also replaces the clicked introduction end button 636 of the selling item with the introduction start button 634, and stops displaying the introduction in-progress display region 638.

The comment control region 624 includes a comment display region 640 and a comment input region 642. The comment display region 640 on the livestreamer side displays the same comments as those in the comment display region 604 on the viewer side. The comment input region 642 also accepts comment input by the livestream operator 32. The livestream operator 32 enters his/her comment in the comment input region 642 and taps the send button. Upon detection of the tap on the send button, the comment processing unit 304 generates the comment input signal that includes the comment entered in the comment input region 642, and transmits the signal to the LC server 10 over the network 60.

Figure 16:
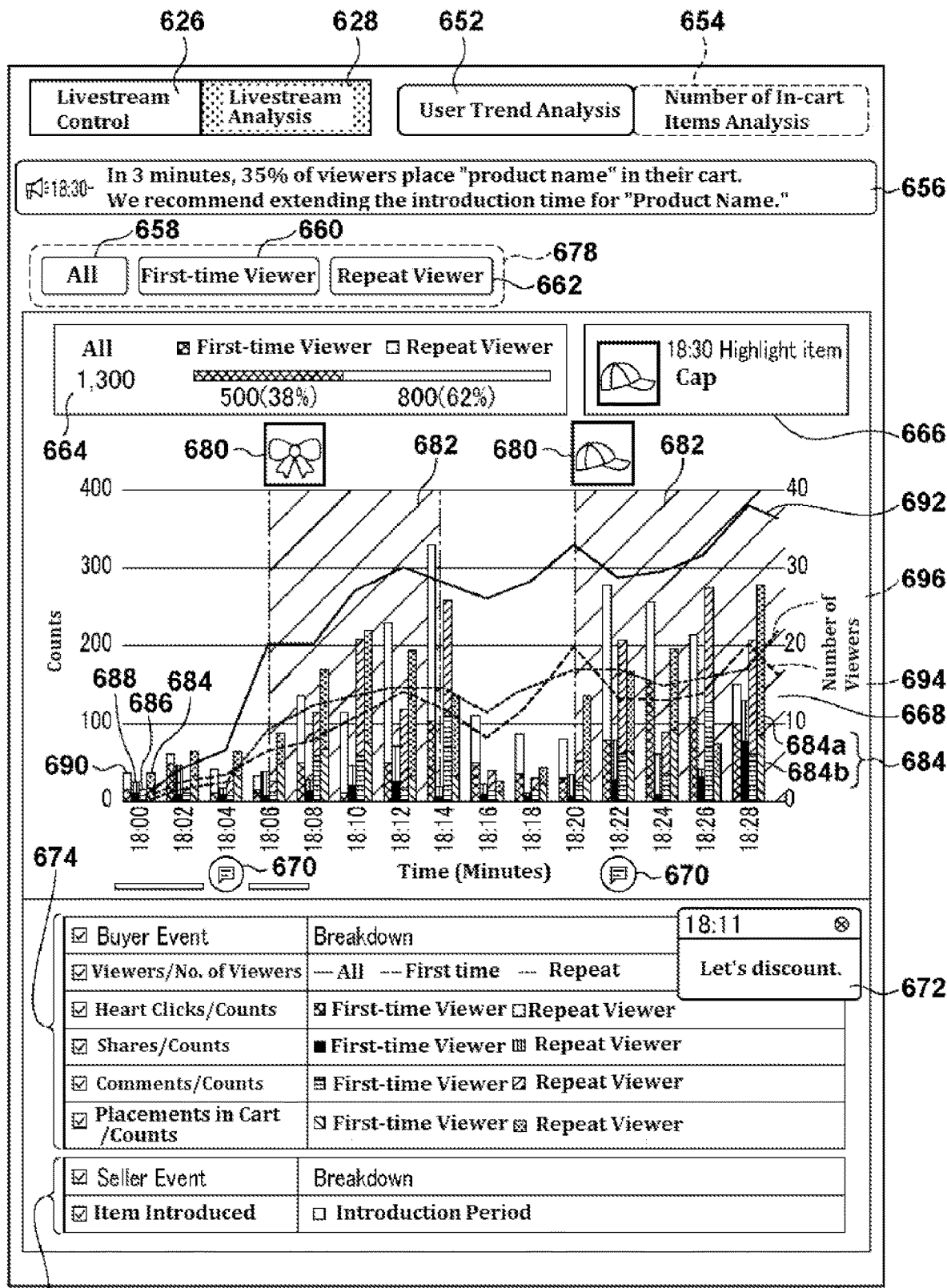
FIG. 16 is a representative screen image of a user trend analysis screen displayed on the display of the livestreamer control terminal of the livestream operator.

FIG. 16 is a representative screen image of a user trend analysis screen 650 displayed on the display of the livestreamer control terminal 30 of the livestream operator 32. The display control unit 302 work in conjunction with the graph display unit 308 and the message display unit 310 to receive the data of the user trend analysis screen 650 from the LC server 10 and display the user trend analysis screen 650 on the display. When the livestream operator 32 clicks the livestream analysis tab button 628 on the livestream control screen 620 of FIG. 15, the display control unit 302 causes a transition from the livestream control screen 620 to the user trend analysis screen 650. The example of FIG. 16 shows the mode of displaying the analysis screen, so the livestream analysis tab button 628 is highlighted. The user trend analysis screen 650 includes the livestream control tab button 626, the livestream analysis tab button 628, a user trend analysis tab button 652, a number of in-cart items analysis tab button 654, a real-time message display region 656, an viewer category selection region 678, a viewer breakdown display region 664, a graph display region 668, a past message icon 670, a past message popup 672, a viewer-side legend display region 674, and a livestreamer-side legend display region 676. The example of FIG. 16 shows the mode of displaying the user trend analysis screen 650, so the user trend analysis tab button 652 is highlighted.

The message display unit 310 displays messages from the administrator 42 or from the system received from the LC server 10 in real time in the real-time message display region 656. The real-time message display region 656 displays the current time streamed and a message pertaining to suggestion or warning. When there is no message, the real-time message display region 656 may be not displayed.

The viewer category selection region 678 is an area for the livestream operator 32 to select a viewer category for analysis. The viewer category selection region 678 includes an all button 658, a first-time viewer button 660, and a repeat viewer button 662. In the embodiment, each viewer is classified into one of several categories depending on his/her activity history. In particular, viewers are classified into two categories: whether they are new viewers (first-time viewers) or repeat viewers (regular viewers) for the livestreamer of the LC livestream. When generating the user trend analysis screen 650, the analysis screen generator 110 refers to the viewer history holding unit 122 and viewer information holding unit 124 and classifies the viewer as the repeat viewer if the viewing history of the viewer watching the target LC livestream includes the livestreamer ID of the livestreamer of that LC live stream, If not, the viewer is classified as the new viewer. When the all button 658 is selected in the viewer category selection region 678, the analysis screen generator 110 makes all viewers subject to analysis regardless of category. When the first time viewer button 660 is selected, the analysis screen generator 110 targets only new viewers for analysis. When the repeat viewer button 662 is selected, the analysis screen generator 110 targets only repeat viewers for analysis. The case in which the all button 658 is selected is described below.

In this embodiment, described is the case where the new viewers and repeat viewers are employed as the viewer categories, but other categories may be used in other embodiments. For example, categories may be defined by action history, such as whether or not the viewer has made a comment or the number of comments made, whether or not the viewer has sent a gift or the number of gifting, whether or not the viewer has sent an effect or the number of effect transmissions made, whether or not the viewer has made a purchase or the number of purchases on the live commerce platform, and whether or not the viewer visited the livestreamer's website. Alternatively, categories may be defined by viewer attributes. Alternatively, categories may be defined by preferences determined based on the viewer's action history.

The viewer breakdown display region 664 shows a breakdown (number and percentage) of viewers by category. The viewer breakdown display region 664 displays the total number of current viewers of the LC livestream, the percentage and number of first-time viewers, and the percentage and number of repeat viewers.

The currently introduced selling item display region 666 displays information indicating the selling item that is currently being introduced in the target LC livestream. The currently introduced selling item is a selling item for which the introduction start request signal has been received but the introduction end request signal has not been received. The currently introduced selling item display region 666 displays a thumbnail of the currently introduced selling item, the current time streamed, and a description of the currently introduced selling item.

The graph display unit 308 displays, in the graph display region 668, a graph in which the horizontal axis is the time streamed and a sales object and the reaction object are superimposed. The sales object is an object indicating activities pertaining to introduction of a selling item in the LC livestream. The sales object includes a thumbnail 680 of a selling item and an introduction period display object 682 that indicates the period during which the selling item was or is introduced. The introduction period display object 682 is a transparent gray object that fills the space between the beginning and the end of the period during which the selling item represented by the corresponding thumbnail 680 was or is being introduced in the LC livestream. In the example of the graph of FIG. 16, introduction of the selling item "ribbon" started at the streaming time "18:06" and ended at the streaming time "18:14", so the introduction period display object 682 (gray area) corresponding to that period is displayed.

When multiple selling items are introduced in the LC livestream, the sales object includes multiple objects, each of which indicates activities related to the introduction of the corresponding selling items. In the example of FIG. 16, the thumbnail of the selling item "ribbon" and the introduction period display object, and the thumbnail of the selling item "cap" and the introduction period display object are displayed on the graph. This example describes a case where a single selling item is introduced at a time, but when multiple selling items are introduced simultaneously, multiple different introduction period display objects may be partially overlapped each other on the graph.

The reaction objects on the user trend analysis screen 650 of FIG. 16 include a bar graph object 686 showing the number of comments in the LC livestream, a bar graph object 688 showing the number of times the LC livestream is shared, a bar graph object 690 showing the number of times the heart button 608 is pressed in the LC livestream, a bar graph object 684 showing the number of actions taken to order a selling item in the LC livestream, a line graph object 692 showing trend in the total number of viewers of the LC livestream, a line graph object 694 showing trend in the total number of the first-time viewers of the LC livestream, and a line graph object 696 showing trend in the total number of the repeat viewers of the LC livestream. In this example, the bar graph object 684 shows the number of item placements in cart occurred during the target LC livestream. In this example, the analysis screen generating unit 110 counts the number of comments, number of shares, number of heart effect transmissions, number of item placements in cart, and number of viewers, by referring to each corresponding history holding unit every minute. The analysis screen generating unit 110 generates the bar graph objects 684, 686, 688, 690 and the line graph objects 692, 694, 696 based on the aggregate results.

The bar graph object 684 showing the number of item placements that occurred in the target LC livestream includes a portion 684b indicating the number of item placements in cart by the first-time viewers and a portion 684a indicating the number of item placements in cart by the repeat viewers. The bar graph object 686 showing the number of comments in the target LC livestream includes a portion showing the number of comments posted by the first-time viewers and a portion showing the number of comments posted by the repeat viewers. The bar graph object 688 showing the number of times the target LC livestream is shared includes a portion showing the number of times the LC livestream is shared by the first-time viewers and a portion showing the number of times the LC livestream is shared by the repeat viewers. The bar graph object 690 showing the number of times the heart button 608 is specified in the LC livestream includes a portion showing the number of times the heart effect is sent by the first-time viewers and a portion showing the number of times the heart effect is sent by the repeat viewers.

The past message icon 670 is an icon representing a message from the administrator 42 or from the system that was received from the LC server 10 in the past. The past message icon 670 is displayed below the horizontal axis of the graph at a position corresponding to the streaming time at which the corresponding message was received. When the livestream operator 32 taps the past message icon 670, the display control unit 302 superimposes on the user trend analysis screen 650 the past message popup 672 that displays the past message corresponding to the tapped past message icon 670.

The viewer-side legend display region 674 shows legends of the reaction objects. The viewer-side legend display region 674 has a check box for each item. When the checkbox is checked, the object for the corresponding item is displayed, and when the checkbox is unchecked, the object for the corresponding item is not displayed.

The livestreamer-side legend display region 676 shows legends of the sales objects. The livestreamer-side legend display region 676 has a check box for each item. When the checkbox is checked, the object for the corresponding item is displayed, and when the checkbox is unchecked, the object for the corresponding item is not displayed.

Figure 17:
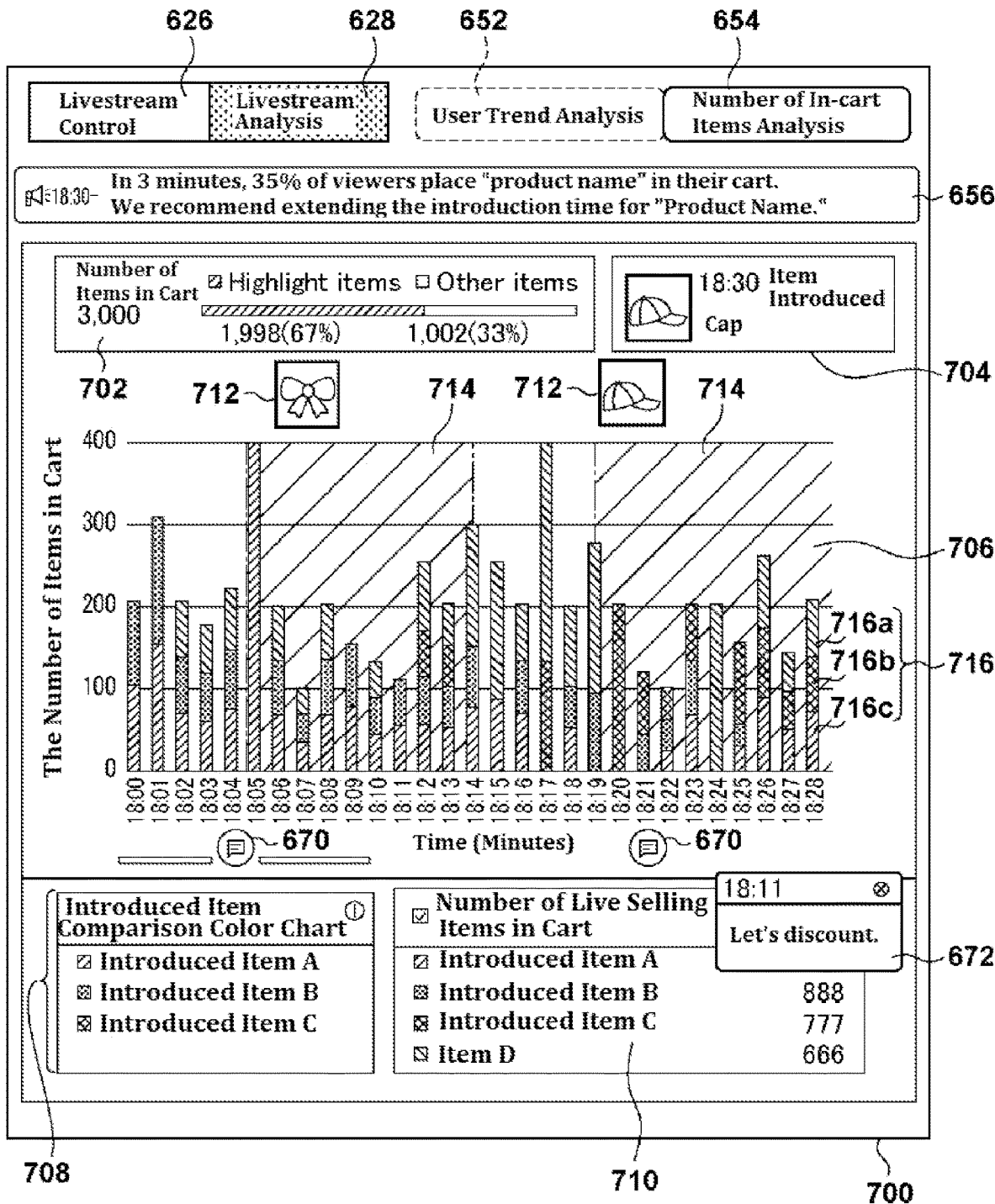
FIG. 17 is a representative screen image of a number of in-cart items analysis screen displayed on the display of the livestreamer control terminal of the livestream operator.

FIG. 17 is a representative screen image of a number of in-cart items analysis screen 700 displayed on the display of the livestreamer control terminal 30 of the livestream operator 32. The display control unit 302 work in conjunction with the graph display unit 308 and the message display unit 310 to receive the data of the number of in-cart items analysis screen 700 from the LC server 10 and display the number of in-cart items analysis screen 700 on the display. When the livestream operator 32 clicks the number of in-cart items analysis tab button 654 on the user trend analysis screen 650 of FIG. 16, the display control unit 302 causes a transition from the user trend analysis screen 650 to the number of in-cart items analysis screen 700. The example of FIG. 17 shows the mode of displaying the number of in-cart items analysis screen 700, so the number of in-cart items analysis tab button 654 is highlighted.

The number of in-cart items analysis screen 700 includes the livestream control tab button 626, the livestream analysis tab button 628, the user trend analysis tab button 652, the number of in-cart items analysis tab button 654, the real-time message display region 656, an in-cart item breakdown display region 702, a currently introduced selling item display region 704, a graph display region 706, the past message icon 670, the past message popup 672, an introduced selling item legend display region 708, and a number of in-cart items display region 710.

The in-cart item breakdown display region 702 shows a breakdown (the number and percentage) of selling items in cart by category. The in-cart item breakdown display region 702 displays the total number of items in cart so far in the LC livestream, the percentage and number of introduced selling items ("Highlight items" in FIG. 17) in cart, and the percentage and number of unintroduced selling items ("Other items" in FIG. 17) in cart. In the embodiment, each selling item is classified into one of several categories depending on its attribute. Specifically, the selling items are classified into two categories: those that have been introduced or will be introduced in the target LC livestream (introduced selling items) or those that have not been introduced or will not be introduced (unintroduced selling items). When generating the number of in-cart items analysis screen 700, the analysis screen generating unit 110 classifies selling items placed in cart in the target LC livestream as either the introduced selling item or the unintroduced selling item by referring to the livestream information holding unit 116.

The currently introduced selling item display region 704 displays information indicating the selling item that is currently being introduced in the target LC livestream. The currently introduced selling item is a selling item for which the introduction start request signal has been received but the introduction end request signal has not been received. The currently introduced selling item display region 704 displays a thumbnail of the currently introduced selling item, the current time streamed, and a description of the currently introduced selling item.

The graph display unit 308 displays, in the graph display region 706, a graph in which the horizontal axis is the time streamed and a sales object and the reaction object are superimposed. The sales object includes a thumbnail 712 of a selling item and an introduction period display object 714 that indicates the period during which the selling item was or is introduced. The thumbnail 712 and introduction period display object 714 of FIG. 17 correspond to the thumbnail 680 and introduction period display object 682 of FIG. 16, respectively.

The reaction objects on the number of in-cart items analysis screen 700 in FIG. 17 include a bar graph object 716 showing the number of items placed in cart in the target LC livestream. The bar graph object 716 includes portions 716a, 716b, and 716c, each showing the in-cart count for the corresponding selling item sold in the LC livestream. In this example, the analysis screen generating unit 110 aggregates the number of each selling item in cart by referring to the cart history holding unit 128 every minute. The analysis screen generating unit 110 generates the bar graph object 716 based on the aggregate results.

The introduced selling item legend display region 708 shows legends of the introduced selling items. The number of in-cart items display region 710 numerically indicates, for each selling item, the total number of the item in cart to that point.

In the above embodiment, an example of a holding unit includes a hard disk or semiconductor memory. It is understood by those skilled in the art that each element or component can be realized by a CPU not shown, a module of an installed application program, a module of a system program, or a semiconductor memory that temporarily stores the contents of data read from a hard disk, and the like.

The live commerce system 1 of the embodiment provides, to the livestreamer, the analysis screen that displays the sales object indicating the sales activities on the livestreamer side and the reaction objects indicating reactions on the viewers side together along the same time axis. By viewing the information displayed on the analysis screen, the livestreamer can find a correlation between the livestreamer's sales activities and the viewer's responses. The livestreamer can optimize the content of the LC livestream based on the discovered correlation to promote sales of selling items.

Further, in the live commerce system 1 of the embodiment, each viewer is classified into one of several categories depending on his/her activity history, and the viewer's response can be displayed for each category on the user trend analysis screen 650. This allows the livestreamer to find a correlation between the viewers' action history and the responses in the LC livestream. Based on the correlations found, the livestreamer is able to narrow down the target audience for the LC livestream, leading to more effective exposure and advertising strategies. For example, if there is a difference in the number of items in cart between the first-time viewers and the repeat viewers, the livestreamer can set the one with a larger number of items as the target audience and make promotions.

In addition, in this live commerce system 1 of the embodiment, the livestreamer side can check, on the number of in-cart items analysis screen 700, information about which and when a selling item was introduced and, as well as the time trend in the item count in cart for each selling item, on the same screen. This allows real-time adjustment of scenarios during the LC livestream. For example, when the number of a certain selling item in cart increases more than expected while the certain selling item is being introduced, the livestreamer can extend the introduction period of the selling item. Alternatively, when the number of a certain selling item in cart does not change from before the introduction and stays the same even while the certain selling item is being introduced, the livestreamer may shorten the introduction period for the selling item, replace the person who introduces the selling item, or offer a discount. Alternatively, when the number of a certain selling item in cart other than the selling item to be introduced increases, such selling item can be newly introduced.

For example, suppose that originally a selling item A, a selling item B, and a selling item C are planed to be introduced in the LC livestream in that order and the introduction is performed as planned in the LC livestream. During the introduction of the selling item A, the number of the selling item C placed in cart increases. The selling item B would be the next one to be introduced. However, in this case, viewers' interest in the selling item C seems to be high, and the introduction of the selling item B can be skipped and the introduction of the selling item C can be started. Alternatively, if the number of the selling item A placed in cart during its introduction period is small, the introduction of the selling item B, which is the same kind of item as the selling item A, can be skipped and the introduction of the selling item C, which is a different kind of item as the selling item A, can be started.

For example, if the number of the selling item B placed in cart, which has not yet been introduced, grows during the introduction of the selling item A, it indicates that the viewers have not seen the introduction or have not shown interest. In this case, the suggestion can be made that the way of introducing the selling item A and the person who introduces the selling item should be reevaluated.

In addition, in the live commerce system 1 of the embodiment, various reactions of viewers (comments, effects, shares, number of people, and number of items in cart) can be checked together on a single screen, the user trend analysis screen 650. Therefore, the perspicuity showing information in table or list is improved and the correlation between the various reactions becomes easier to understand.

In addition, in the live commerce system 1 of the embodiment can display messages from the administrator or from the system on the analysis screen in real time. This allows the livestreamer to receive useful comments and feedbacks from the administrator or the system on the ongoing LC livestream in real time and reflect them in the content of the LC livestream. For example, when the system detects that 50% of the viewers have placed a particular selling item in their cart in the past three minutes, this indicates that the viewers are interested in that selling item, so the system can generate and provide a message to the livestreamer to encourage the livestreamer to introduce the selling item longer.

In addition to the number of in-cart items analysis screen 700, which shows a change in the number of items in cart over time, the system also provides the user trend analysis screen 650, which shows a change in the number of effects, comments, shares, and viewers over time. This allows for multifaceted measurement of the effectiveness of the introduction of the selling items. For example, for the unit price of a selling item is high, such as a car, the number of such a selling item in cart is smaller and more easily affected by noise. Even in such cases, more accurate measurement of effectiveness is possible by examining the number of effects, comments, shares, and viewers over time.

Figure 18:
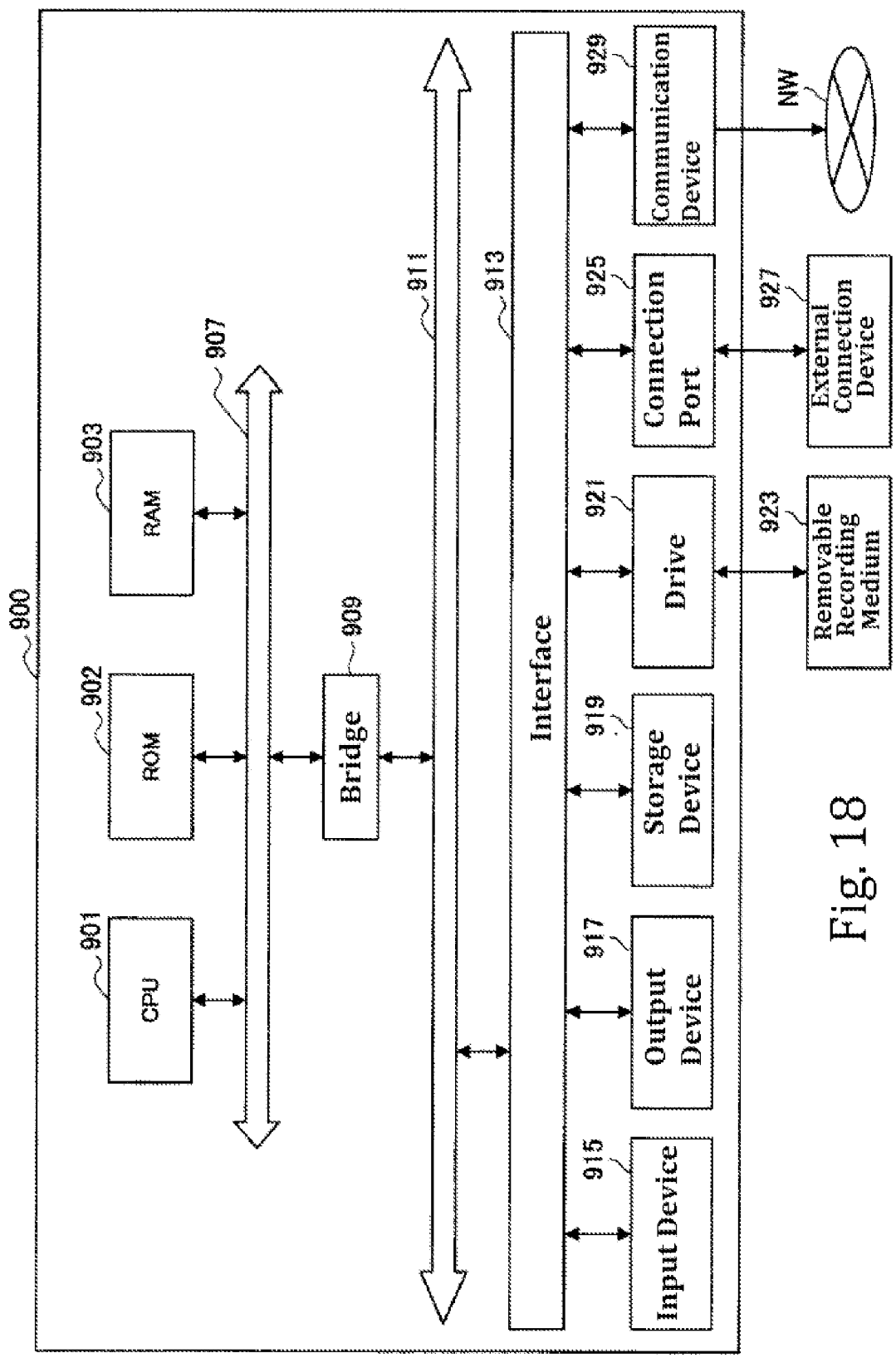
FIG. 18 is a block diagram showing an example of a hardware configuration of the information processing device according to the embodiment.

Referring to FIG. 18, the hardware configuration of an information processing device relating to an embodiment of the disclosure will be now described. FIG. 18 is a block diagram showing an example of the hardware configuration of the information processing device according to the embodiment. The illustrated information processing devices 900 may, for example, realize the LC server 10, the livestreamer mobile terminal 20, the livestreamer control terminal 30, the administrator terminal 40, and the viewer terminal 50 in the embodiment.

The information processing device 900 includes a CPU 901, ROM (Read Only Memory) 902, and RAM (Random Access Memory) 903. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). In addition to or instead of the CPU 901, the information processing device 900 may also include a processing circuit such as a DSP (Digital Signal Processor) or ASIC (Application Specific Integrated Circuit).

The CPU 901 functions as an arithmetic processing device and a control device, and controls all or some of the operations in the information processing device 900 according to various programs stored in the ROM 902, the RAM 903, the storage device 919, or a removable recording medium 923. For example, the CPU 901 controls the overall operation of each functional unit included in the server 10 and the user terminals 20 and 30 in the embodiment. The ROM 902 stores programs including sets of instructions, calculation parameters, and the like used by the CPU 901. The RAM 903 serves as a primary storage that stores programs including sets of instructions to be used in the execution of the CPU 901, parameters that appropriately change in the execution, and the like. The CPU 901, ROM 902, and RAM 903 are interconnected to each other by the host bus 907 which may be an internal bus such as a CPU bus. Further, the host bus 907 is connected to the external bus 911 such as a PCI (Peripheral Component Interconnect/Interface) bus via the bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OELD, etc., a sound output device such as a speaker and headphones, and a printer. The output device 917 outputs the results of processing by the information processing device 900 as text, video such as images, or sound such as audio.

The storage device 919 is a device for storing data configured as an example of a storage unit of the information processing device 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for the removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 903. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is, for example, a camera for capturing an image of the real space to generate the captured image. The image capturing device uses an imaging element such as a CCD (Charge Coupled Device) or CMOS (Complementary Metal Oxide Semiconductor) and various elements such as lenses that are provided to control image formation of a subject on the imaging element. The image capturing device may capture a still image or may capture a moving image.

The configuration and operation of the live commerce system 1 in the embodiment have been described. This embodiment is merely an example, and it will be understood by those skilled in the art that various modifications are possible by combining the respective components and processes, and that such modifications are also within the scope of the present disclosure.

The case in which the sales objects include the thumbnail 680 and the introduction period display object 682 has been described in the above embodiment, however it is not limited to this case. Other examples of the sales objects that indicate sales activities on the livestreamer side may include the followings.

A mark indicating the point in time when introduction of a selling item is started, and a mark indicating the point in time when the introduction is ended A mark indicating the start of distribution of a coupon for a selling item A mark indicating the start of discounting of a selling item and the amount or percentage of the discount An icon indicating a person on the livestreamer side who introduces a selling item When a sales object related to a coupon or discount is displayed, the livestreamer can measure the sales promotion effect of the coupon or discount.

In the above embodiment, the case in which the livestream operator 32 instructs the start or end of the introduction of a selling item through the livestreamer control terminal 30 has been described. However, it is not limited to this case. For example, the LC server 10 may detect the start or end of the introduction of a selling item by recognizing and analyzing the audio of the LC livestream.

The case in which the thumbnail 680 and introduction period display object 682 are displayed along the time axis on the number of in-cart items analysis screen 700 has been described in the above embodiment, however it is not limited to this case. FIG. 19 schematically illustrates a graph display region 800 of the number of in-cart items analysis screen of a modification example. The graph display unit 308 displays a graph in the graph display region 800 with the horizontal axis being the time streamed. The reaction objects include a bar graph object 802 showing the number of items placed in cart in the LC livestream. The bar graph object 802 includes portions 802a and 802b, each showing the number of a selling item in cart, the selling item is sold in the LC livestream. A sales object 804 includes two or more indicators 804a, 804b, each corresponding to an introduction period of the corresponding selling item. In the example of FIG. 19, the selling item corresponding to the portion 802a of the bar graph object 802 is introduced in the LC livestream during the period indicated by the indicator 804b (18:14 to 18:20). The selling item corresponding to the portion 802b of the bar graph object 802 is introduced in the LC livestream during the period indicated by the indicator 804a (18:06 to 18:10). In this example, for the sales object and the reaction object, the portions corresponding to the same selling item are shown in the same or corresponding manner (color, hatching, etc.). This improves the visibility of correlation.

In the above embodiment, the case where the reaction object indicates the number of actions performed by viewers to order the selling item has been described, but it is not limited to this case. For example, the reaction object may include an object representing the number of orders for the selling item or the sales amount of the selling item.

The procedures described herein, particularly those described with a flow diagram or a flowchart, are susceptible of omission of part of the steps constituting the procedure, adding steps not explicitly included in the steps constituting the procedure, and/or reordering the steps. The procedure subjected to such omission, addition, or reordering is also included in the scope of the present disclosure unless diverged from the purport of the present invention.

At least some of the functions realized by the LC server 10 may be realized by a device(s) other than the LC server 10, for example, the livestreamer mobile terminal 20, the livestreamer control terminal 30, and the viewer terminal 50. At least some of the functions realized by the livestreamer mobile terminal 20, the livestreamer control terminal 30, and the viewer terminal 50 may be realized by a device(s) other than these terminals, for example, the LC server 10.

What is claimed is:

1. A terminal, comprising:
   one or more processors; and
   memory storing one or more computer programs configured to be executed by the one or more processors,
   the one or more computer programs including instructions for:
   displaying a control screen and an analysis screen of a livestream associated with a selling item on a display, wherein the control screen shows at least one thumbnail of the selling item and an introduction start button of the selling item;
      upon detection of the introduction start button being pressed, generating an introduction start request signal including a selling item ID of the selling item, and transforming the introduction start button into an introduction end button;
      upon the detection of the introduction end button being pressed, generating an introduction end request signal including the selling item ID of the selling item, and transforming the introduction end button into the introduction start button; and displaying, on the analysis screen, a first object indicating a sales activity on a livestreamer side and a second object indicating reactions on viewers side together along a same time axis, wherein the first object includes the thumbnail of the selling item and an introduction period display object indicating a period during which the selling item was or is introduced, and the thumbnail and the introduction period display object of the first object are changed and calculated according to the introduction start request signal and the introduction end request signal on the basis of the selling item ID.

2. The terminal of claim 1, wherein the second object includes an object indicating a number of actions to order a selling item, and the first object includes an object indicating an activity related to introduction of the selling item in the livestream.

3. The terminal of claim 2, wherein the livestream is associated with a plurality of selling items, and
wherein the second object includes a plurality of objects, each indicating the number of actions to order a corresponding selling item, and the first object includes a plurality of objects, each indicating the activity related to introduction of a corresponding selling item.

4. The terminal of claim 1, wherein each viewer is classified into one of a plurality of categories depending on an action history of the viewer, and the second object includes a plurality of objects, each of which indicates reactions of viewers of a corresponding category.

5. The terminal of claim 1, wherein the second object includes at least one selected from the group consisting of: an object indicating a number of comments in the livestream, an object indicating a number of times the livestream is shared, and an object indicating a number of times a predetermined icon is specified, in the livestream.

6. The terminal of claim 1, wherein the one or more computer programs further include instructions for displaying a message from an administrator side on the analysis screen in real time.

7. The terminal of claim 1, wherein the analysis screen includes a graph showing the first object and the second object together along the same time axis.

8. The terminal of claim 1, wherein the analysis screen is generated based on first history data indicating a history of the sales activity on the livestreamer side and second history data indicating the reactions on the viewers side.

9. The terminal of claim 8, wherein the first history data includes the selling item ID for identifying the selling item and first time data indicating when the livestreamer side started introduction of the selling item.

10. A method, comprising:
displaying a control screen and an analysis screen of a livestream associated with a selling item on a display, wherein the control screen shows at least one thumbnail of the selling item and an introduction start button of the selling item;
upon detection of the introduction start button being pressed, generating an introduction start request signal including a selling item ID of the selling item, and transforming the introduction start button into an introduction end button;
upon the detection of the introduction end button being pressed, generating an introduction end request signal including the selling item ID of the selling item, and transforming the introduction end button into the introduction start button; and
displaying, on the analysis screen, a first object indicating a sales activity on a livestreamer side and a second object indicating reactions on viewers side together along a same time axis, wherein the first object includes the thumbnail of the selling item and an introduction period display object indicating a period during which the selling item was or is introduced, and the thumbnail and the introduction period display object of the first object are changed and calculated according to the introduction start request signal and the introduction end request signal on the basis of the selling item ID.

11. The method of claim 10, wherein the second object includes an object indicating a number of actions to order a selling item, and the first object includes an object indicating an activity related to introduction of the selling item in the livestream.

12. The method of claim 11, wherein the livestream is associated with a plurality of selling items, and
wherein the second object includes a plurality of objects, each indicating the number of actions to order a corresponding selling item, and the first object includes a plurality of objects, each indicating the activity related to introduction of a corresponding selling item.

13. The method of claim 10, wherein each viewer is classified into one of a plurality of categories depending on an action history of the viewer, and the second object includes a plurality of objects, each of which indicates reactions of viewers of a corresponding category.

14. The method of claim 10, wherein the second object includes at least one selected from the group consisting of: an object indicating a number of comments in the livestream, an object indicating a number of times the livestream is shared, and an object indicating a number of times a predetermined icon is specified, in the livestream.

15. The method of claim 10, wherein the one or more computer programs further include instructions for displaying a message from an administrator side on the analysis screen in real time.

16. The method of claim 10, wherein the analysis screen includes a graph showing the first object and the second object together along the same time axis.

17. A server, comprising:
a relay unit adapted to transmit a video data related to a livestream from a terminal of a livestreamer side to a terminal of a viewer side, the livestream being associated with a selling item;
a sales activity receiving unit adapted to receive a signal indicating sales activity on the livestreamer side during the livestream from the terminal of the livestreamer side over a network;
a reaction receiving unit adapted to receive a signal indicating a reaction from the viewer side during the livestream from the terminal of the viewer side over the network;
a generating unit adapted to generate an analysis screen on which a first object indicating the sales activity on the livestreamer side and a second object indicating the reaction on the viewer side are displayed together along a same time axis; and
a transmission unit adapted to transmit the generated analysis screen to the terminal of the livestreamer side over the network;
wherein, a control screen is generated and displayed on the terminal of the livestreamer side with the analysis screen, and the control screen shows at least one thumbnail of the selling item and an introduction start button of the selling item;
upon detection of the introduction start button being pressed, an introduction start request signal including a selling item ID of the selling item is generated by the terminal of the livestreamer side, and the introduction start button is transformed into an introduction end button;

upon the detection of the introduction end button being pressed, an introduction end request signal including the selling item ID of the selling item is generated by the terminal of the livestreamer side, and the introduction end button is transformed into the introduction start button;

wherein, the first object includes the thumbnail of the selling item and an introduction period display object indicating a period during which the selling item was or is introduced, and the thumbnail and the introduction period display object of the first object are changed and calculated by the generating unit according to the introduction start request signal and the introduction end request signal on the basis of the selling item ID.

18. The server of claim 17, wherein capturing an image of the livestream and displaying the control screen and the analysis screen are performed at different terminals.

19. The server of claim 17, wherein the analysis screen includes a graph showing the first object and the second object together along the same time axis.

* * * * *